United States Patent
Weber et al.

(10) Patent No.: US 11,562,101 B2
(45) Date of Patent: Jan. 24, 2023

(54) ON-DEVICE BITSTREAM VALIDATION

(71) Applicant: Intel Corporation, Santa Clara, CA (US)

(72) Inventors: Scott J. Weber, Piedmont, CA (US); Sean R. Atsatt, Santa Cruz, CA (US); Andrew Martyn Draper, Chesham (GB); David Samuel Goldman, Philadelphia, PA (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 16/020,805

(22) Filed: Jun. 27, 2018

(65) Prior Publication Data

US 2019/0050604 A1 Feb. 14, 2019

Related U.S. Application Data

(60) Provisional application No. 62/585,522, filed on Nov. 13, 2017.

(51) Int. Cl.
*H04L 9/30* (2006.01)
*H04L 29/06* (2006.01)
*G06F 21/76* (2013.01)
*H03M 13/27* (2006.01)
(Continued)

(52) U.S. Cl.
CPC ............. *G06F 21/76* (2013.01); *G06F 7/584* (2013.01); *G06F 21/73* (2013.01); *H03M 13/27* (2013.01)

(58) Field of Classification Search
CPC .................................. G06F 21/76; G06F 7/584
See application file for complete search history.

(56) References Cited

U.S. PATENT DOCUMENTS 7,620,876 B2 * 11/2009 Lewis .................... G11C 29/52
714/763
7,673,273 B2 * 3/2010 Madurawe .............. G06F 30/30
716/138

(Continued)

OTHER PUBLICATIONS

U.S. Appl. No. 15/719,058, filed Sep. 28, 2017, Atsatt et al.
U.S. Appl. No. 15/719,413, filed Sep. 28, 2017, Weber et al.

*Primary Examiner* — Wasika Nipa
(74) *Attorney, Agent, or Firm* — Fletcher Yoder, P.C.

(57) ABSTRACT

A programmable logic device verifies that configuration data permissibly programs the programmable logic device. The programmable logic device includes a programmable fabric having partitions to be programmed by the configuration data, a secure device manager that may generate masks based on the configuration data, and a local sector manager. The masks determine that the configuration data is configured to permissibly program the permitted partitions or that the permitted partitions have been permissibly programmed. The local sector manager applies the masks to generate an interleaved result, compares the interleaved result to an expected result, and sends an indication that the configuration data is configured to permissibly program the permitted partitions or permissibly programmed the permitted partitions in response to determining that the interleaved result is the expected result, or sends an alert to stop programming in response to determining that the interleaved result is not the expected result.

21 Claims, 14 Drawing Sheets

(51) Int. Cl.
*G06F 7/58* (2006.01)
*G06F 21/73* (2013.01)

(56) References Cited

U.S. PATENT DOCUMENTS

| | | | |
|---|---|---|---|
| 2003/0163657 A1* | 8/2003 | Gupta | G06F 12/0607 711/157 |
| 2013/0129081 A1* | 5/2013 | Guillet | H04L 9/003 380/28 |
| 2013/0232304 A1* | 9/2013 | Lohman | G06F 12/0607 711/127 |
| 2016/0092135 A1* | 3/2016 | Strasser | G06F 11/1044 711/154 |

* cited by examiner

ON-DEVICE BITSTREAM VALIDATION

CROSS REFERENCE TO RELATED APPLICATIONS

This application claims the benefit of U.S. Provisional Application No. 62/585,522, entitled "On-Device Bitstream Validation," filed Nov. 13, 2017, which is incorporated herein by reference in its entirety for all purposes.

BACKGROUND

The present disclosure relates generally to configuring programmable devices, such as field programmable gate arrays (FPGAs). More particularly, the present disclosure relates to on-device validation of configuration data used to program the programmable device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern electronics such as computers, portable devices, network routers, data centers, Internet-connected appliances, and more, tend to include at least one integrated circuit device. Integrated circuit devices take a variety of forms, including processors, memory devices, and programmable devices, to name only a few examples. A field programmable gate array (FPGA) is one type of programmable device utilizing integrated circuits. Programmable devices may include logic that may be programmed (e.g., configured, partially configured) and reprogrammed (e.g., reconfigured, partially reconfigured) after manufacturing to provide a wide variety of functionality based on various designs (e.g., circuit designs) possible within the programmable devices. Thus, programmable devices may include a programmable fabric composed of programmable logic (e.g., programmable logic sectors, configurable logic blocks (CLBs)) that may be programmed and reprogrammed to perform a variety of functions on the devices, according to the design. The programmable devices, or a partition of the programmable device, may be programmed in numerous different configurations by loading the design onto the programmable devices, for example, via a configuration bitstream. However, configuration data stored within the programmable device during (re)configuration or partial (re)configuration of the programmable fabric may program the device in a manner unintended (e.g., not permitted to program) by the design.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
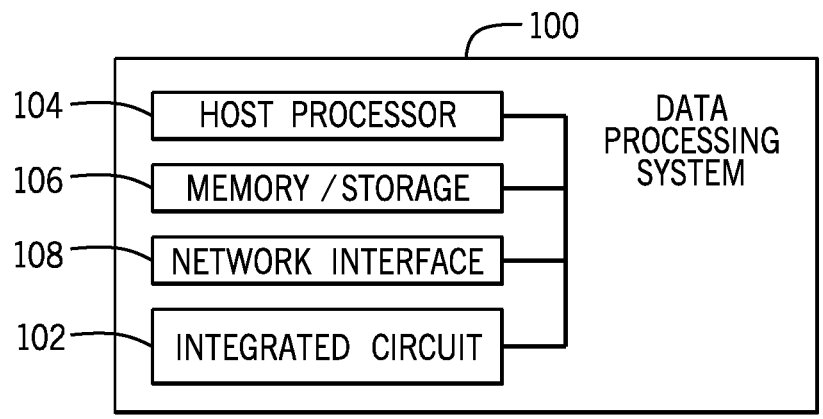
FIG. 1 is a block diagram of a data processing system that may utilize an integrated circuit (e.g., programmable device) for on-device validation checks of configuration data used to program the integrated circuit, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to verifying programming of a programmable device by implementing on-device validation checks of a design (e.g., in the form of configuration data) via configuration hardware used to program the programmable device.

Generally, programmable devices (e.g., FPGAs) may be initially configured and later reconfigured to realize a circuit design, for example, via the configuration data describing the circuit design. Additionally or alternatively, the programmable device may be partially configured and partially reconfigured to realize a portion of the circuit design, for example, when a peripheral device is interfaced with the programmable device. The term "program" may include the initial configuration of the programmable device and/or the partial configuration of a target partition(s) of the programmable device. Further, the term "reprogram" may include the reconfiguration of the programmable device and/or the partial reconfiguration of the target partition(s) of the programmable device once the programmable device has already been programmed.

The programmable device may use specific configuration hardware paths to encrypt, authenticate, and store configuration data during programming of the programmable device. For example, the programmable device may use security modules (e.g., secure device managers (SDMs)) to authenticate configuration data and random-access-memory based memory cells to store configuration data. Regardless, the configurable nature of the programmable devices renders the devices useful for post-manufacturing (e.g., in-field) configuration applications. As the value of the programmable device's configurable functionality increases, so does the desire for validating that the programmable devices are programmed by the configuration data as intended (e.g., programs permitted portions of the programmable fabric and does not program non-permitted portions of the programmable fabric).

In some instances, to validate that the configuration data has appropriately programmed (e.g., stored in correct areas of the configuration memory) the programmable device, the configuration data may be read (e.g., loaded) from the configuration memory of the programmable device and compared to a check value associated with the data stored in a particular area of the configuration memory. However, validating the configuration data externally (e.g., from the device) may be a lower fidelity solution than on-device configuration data validation and may result in security and complexity challenges as the configuration data must be handled in a secure manner by software and personnel. Thus, improved systems and methods for performing on-device configuration validation may be desired.

Accordingly, the present disclosure provides systems and methods for performing on-device validation checks of the configuration data used to program the programmable fabric of the programmable device. In an embodiment, the configuration hardware used to program the programmable device may also be used to perform the validation checks of the configuration data. For example, a secure device manager (SDM) may provide a check value in secure plaintext form that is compared to the configuration data stored in configuration memory frames, thereby verifying the stored configuration data during the on-device validation check without comprising their security. As another example, the secure device managers and local sector managers (LSM) used to configure a target partition of the programmable fabric may also perform the validation checks for the target partition and associated non-target regions using, for example, a linear-feedback shift register (LFSR) technique.

Additionally or alternatively, in some embodiments, the validation checks may use one or more masks to verify that the configuration data used to program the programmable device modifies configuration memory owned only by the programmable fabric or by the target partition of the programmable fabric associated with the configuration data. For example, the validation checks may verify that the configuration data does not modify configuration memory areas that may facilitate malicious attacks (e.g., peaking, poking, malicious patristic loading). As another example, the validation checks may verify that the configuration data programs only the target partition of the programmable device and no other areas of the programmable fabric.

Further, using one or more masks may enable a central authority (e.g., a server owner) to verify that the programmable device was programmed as intended (e.g., programs permitted portions of the programmable fabric and does not program non-permitted portions of the programmable fabric) without having knowledge of the configuration data itself. In this manner, proprietary information (e.g., the circuit design) may be verified on the programmable device without sharing the information and without requesting permission from the central authority. As such, validating that the configuration data correctly programmed the programmable fabric using the presently disclosed techniques may reduce or eliminate reliance on secure configuration environments and may ensure that programming of the programmable device occurred as intended (e.g., programs permitted portions of the programmable fabric and does not program non-permitted portions of the programmable fabric).

While the techniques of this disclosure are described chiefly in the context of programmable devices, such as programmable devices with field programmable gate array (FPGA) fabric, this is meant to be illustrative and not limiting. Indeed, the on-device verification process of this disclosure may be implemented in other integrated circuit devices. For example, other types of integrated circuits, such as applicant-specific integrated circuits (ASICs), microprocessors, memory devices, transceivers, and the like, that may include regions of programmable logic.

With the foregoing in mind, FIG. 1 shows a data processing system 100 that may utilize an integrated circuit 102 (e.g., programmable device) to perform on-device validation of configuration data used to program the programmable fabric of the integrated circuit 102, in accordance with embodiments of the present disclosure. The data processing system 100 includes a host processor 104, memory and/or storage circuitry 106, and a network interface 108. The data processing system 100 may include more or fewer components (e.g., electronic display, user interface structures, application specific integrated circuits (ASICs)). The host processor 104 may include any suitable processing module, such as an Intel® Xeon® processor or a reduced-instruction processor (e.g., a reduced instruction set computer (RISC), an Advanced RISC Machine (ARM) processor) that may manage a data processing request for the data processing system 100 (e.g., to perform machine learning, video processing, voice recognition, image recognition, data compression, database search ranking, bioinformatics, network security pattern identification, data encryption, or the like).

The memory and/or storage circuitry 106 may include random access memory (RAM), read-only memory (ROM), one or more hard drives, flash memory, or the like. The memory and/or storage circuitry 106 (e.g., main memory) may be external to the integrated circuit 102 and may store data (e.g., the configuration data) to be processed by the data processing system 100. In some cases, the memory and/or storage circuitry 106 may also store, for example, validation masks and ownership masks for on-device verification of the configuration data stored in the integrated circuit 102. For example, the memory and/or storage circuitry 106 may store masks used by the host processor 104 to verify that the configuration data programmed the target partition of the integrated device 102 as intended (e.g., programs permitted portions of the programmable fabric and does not program non-permitted portions of the programmable fabric). The network interface 108 may allow the data processing system 100 to communicate with other electronic devices. The data processing system 100 may include several different packages or may be contained within a single package on a single package substrate.

In one example, the data processing system 100 may be part of a data center that processes a variety of different requests. For instance, the data processing system 100 may receive a data processing request via the network interface 108 to perform machine learning, video processing, voice recognition, image recognition, data compression, database search ranking, bioinformatics, network security pattern identification, data encryption, or any other suitable specialized task. The host processor 104 may program the programmable fabric of the integrated circuit 102 with information (e.g., a circuit design) related to a requested task by loading the information into the programmable fabric. For example, the integrated circuit 102 may include one or more configuration memory frames in which the information may be stored as configuration data. Further, to securely verify that the programmable fabric was programmed according to the circuit design, the host processor 104 may perform on-device validation checks. For example, the host processor 104 may generate and use validation masks to verify that partial configuration of the programmable fabric occurred only for the target partition. As another example, the host processor 104 may use on-device validation checks described in U.S. patent application Ser. No. 15/719,058, "Maintaining Reconfigurable Partitions in a Programmable Device" and in U.S. patent application Ser. No. 15/719,413, "Integrated Circuit with Peek and Poke Protection Circuitry for a Multi-Tenant Usage Model", which are incorporated herein by reference in their entirety for all purposes.

The systems and methods of this disclosure may be incorporated into any suitable circuit. For example, the systems and methods may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, and the like.

Figure 2:
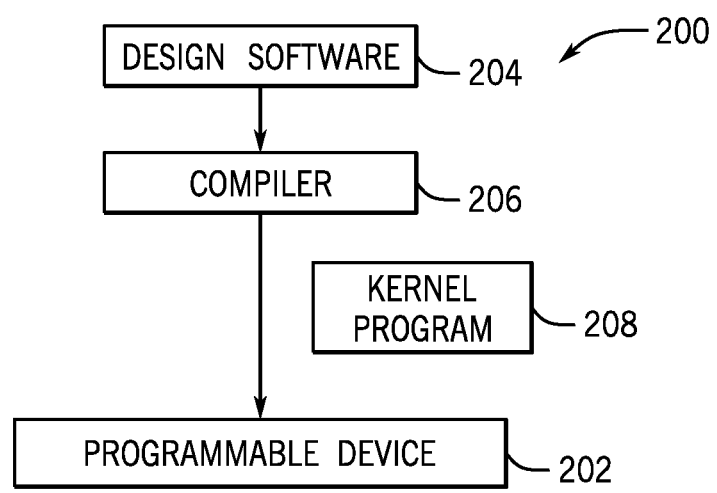
FIG. 2 is a block diagram of a configuration system that may program a programmable device, in accordance with embodiments of the present disclosure.

In some instances, the integrated circuit 102 may be a programmable device 202 that is programmed via a configuration system 200 as shown in FIG. 2, in accordance with embodiments of the present disclosure. A designer may implement functionality on the programmable device 202 (e.g., a field programmable gate array (FPGA)) using design software 204, such as a version of Quartus by Intel Corporation. The design software 204 may use a compiler 206 to generate a low-level circuit design (e.g., the configuration data), which may be provided as a kernel program 208 (e.g., program object file, bitstream) that programs the programmable device 202 by storing the configuration data onto the programmable device 202. That is, the compiler 206 may provide machine-readable instructions representative of the circuit design to the programmable device 202. The configuration data may program the entire programmable fabric of the programmable device 202, one or more target partitions of the programmable fabric, and/or reprogram the programmable fabric as needed.

Figure 3:
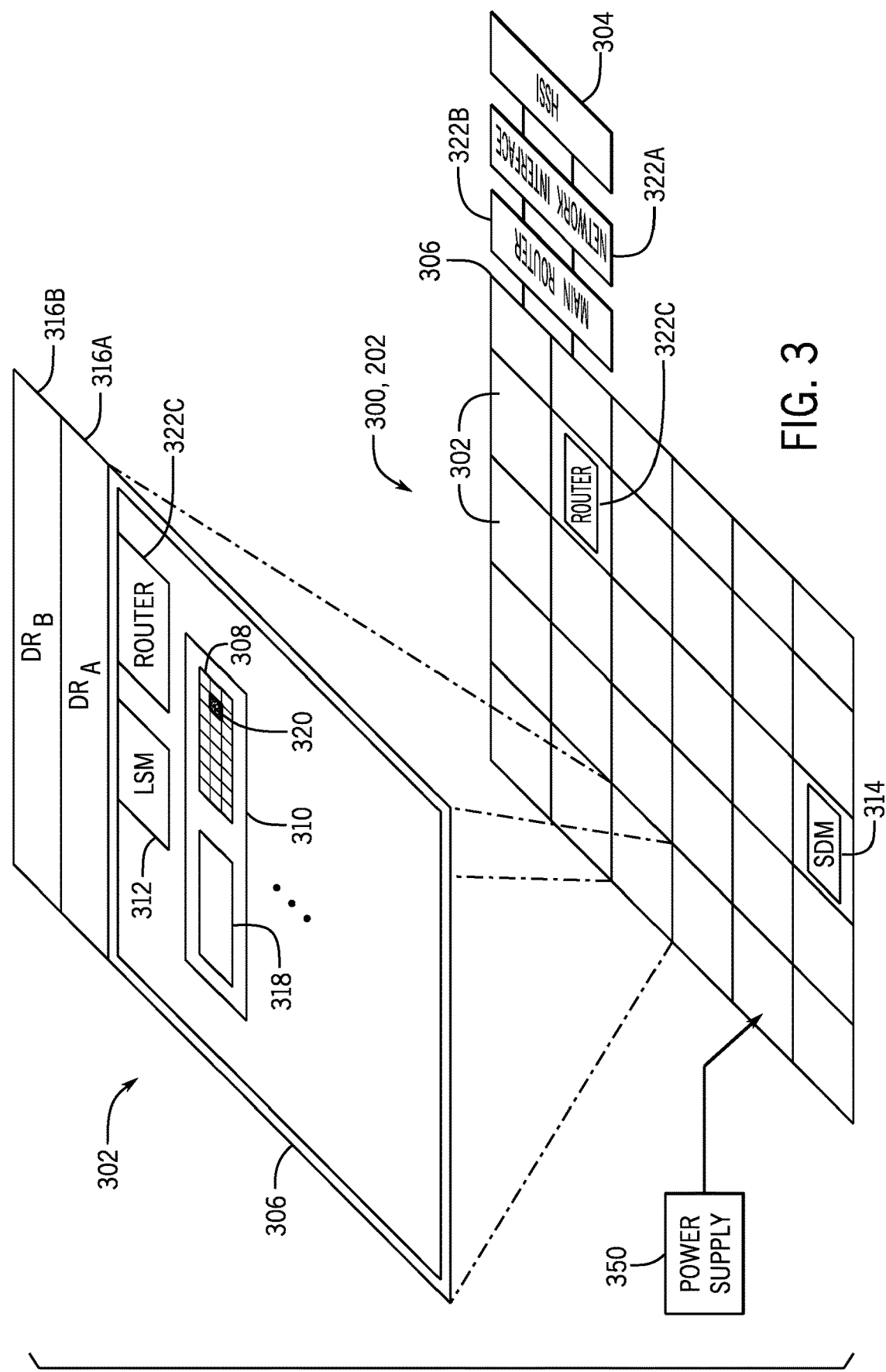
FIG. 3 is a schematic diagram of the programmable device of FIG. 2 that may include programmable logic sectors, in accordance with embodiments of the present disclosure.

The programmable device 202 may be a field programmable gate array (FPGA) 300 that may include programmable logic sectors 302 as shown in FIG. 3, in accordance with embodiments of the present disclosure. Although the FGPA 300 is shown as an example of the programmable device 202, it should be understood that the programmable device 202 may be any suitable type of programmable device (e.g., an application-specific integrated circuit, application-specific standard product, and the like). In one example, the FPGA 300 is sectorized of the type described in U.S. Patent Publication No. 20160049941, "Programmable Circuit Having Multiple Sectors," which is incorporated herein by reference in its entirety for all purposes. The sectors 302 may facilitate parallel functionality in the FPGA 300 and/or resource (e.g., configuration memory) conservation.

The FPGA 300 may include transceiver circuitry 304 (e.g., a high speed serial interface (HSSI)) for driving signals from the FPGA 300 and for receiving signals from other devices. Interconnection resources 306 may be used to route signals, such as block or data signals, through the different sectors 302 of the FPGA 300. Additionally or alternatively, the signals may be routed between the programmable logic sectors 302, to and from the FPGA 300, and/or to and from a local sector manager (LSM) 312 via a network (e.g., a configuration-network-on-chip (CNOC) architecture 322) to achieve high operational efficiency. For example, network interface (NI) 322A may transform on-device validation check instructions into data packets that are then transmitted from the main router 322B to routers 322C of each sector 302 over the network. A power supply 350 may also be coupled to the FPGA 300 to provide voltage and current to power various components of the FPGA 300, such as combinational and sequential logic circuitry 318.

Each of the sectors 302 may include configurable logic blocks (CLBs) 310 that provide logic functionality according to the configuration data stored in the respective sector 302. The configurable logic blocks 310 may include combinational or sequential logic circuitry 318 for performing the functionality programmed by the configuration data. For example, the circuitry 318 may include look-up tables, registers, multiplexers, routing wires, and so forth that perform logic operations on input data. The configurable logic blocks 310 may also include configuration memory 308 composed of one or more memory frames of memory cells 320, such as configuration random-access-memory (CRAM) cells. Additionally or alternatively, the configuration memory 308 may be external to the configurable logic blocks 310 and/or may span multiple sectors 302 of the FPGA 300. The memory cells 320 may provide a corresponding static control output signal to, for example, gates of metal-oxide-semiconductor (MOS) transistors that control the state of the associated configurable logic blocks 310 or programmable components of the interconnection resources 306. Additionally, each memory cell 320 may store one bit of information.

To program the sectors 302, the configuration data associated with the circuit design may be stored in the configuration memory 308 of the appropriate configurable logic blocks 310. As such, the sectors 302 and configurable logic blocks 310 may include additional logic elements to facilitate the storage of the configuration data, such as wires, gates, and registers. For example, during programming, the configuration data may be loaded into data registers 316A and/or 316B and subsequently into the configuration memory 308 using pins and input/output circuitry. In some embodiments, the data registers 316A, 316B may monitor various indications from the local sector manager 312 without firmware and software and use the indications, for example, to implement on-device validation checks of the configuration data. Further, the data registers 316A, 316B may provide local read-back of manipulated data that may further secure the on-device validation checks. It should be appreciated that a greater or fewer number of sectors 302, configurable logic blocks 310, and configuration memory 308/memory cells 320 are contemplated in the present disclosure than shown in FIG. 3.

Each of the sectors 302 may include a local sector manager (LSM) 312 that controls the operation of the respective sector 302. The local sector manager 312 may include a frame and a vector that facilitate the interpretation and verification of each sector. The frame may provide the execution environment (e.g., framework) for automatically testing the configuration data stored within the respective sector 302. Additionally, the vector may be a test vector, which is a set of inputs provided by a system (e.g., the configuration system 200) to test the sector 302 for performance, configuration, and the like. The local sector manager 312 may communicate with a secure device manager (SDM) 314, via, for example, the configuration-network-on-chip architecture 322, to receive and/or transmit signals (e.g., verification instructions) and data (e.g., secure configuration data) from the secure device manager 314.

In addition to these operations, the secure device manager 314 may be augmented with numerous additional capabilities, such as locally sequencing reads and writes to detect errors (e.g., associated with the configuration data) and correct the data stored in the configuration memory cells 320. The secure device manager 314 may further authenticate and encrypt the configuration data to prevent malicious discovery of propriety information that may be included in the configuration data. Furthermore, the secure device manager 314 may generate masks used during on-device validation of the configuration data.

Upon receiving an indication (e.g., signal) from the secure device manager 314 and/or the host processor 104, the local sector manager 312 may, for example, perform on-device verification of the configuration data used to program the FPGA 300. For example, the secure device manager 314 may generate an indication to perform an on-device validation check to determine whether the configuration data programmed only those bits of the configuration memory 308 owned by the configuration data. That is, the on-device validation checks may verify that the configuration data modified only those portions of the programmable fabric that are accessible to the configuration data, as determined by the configuration hardware. Additionally, the indication may include instructions on how to configure the configurable logic blocks 310 of the sector 302 according to the circuit design. Together, the local sector manager 312, the secure device manager 314, and the configuration-network-on-chip architecture 322 may be used to program the programmable device 202 and/or to perform secure, on-device validation checks to determine whether the programmable device 202 was programmed as intended.

The secure device manager 314 and the local sector manager 312 may be implemented as state machines and/or processors. That is, each operation of the secure device manager 314 or the local sector manager 312 may be implemented as a separate routine in a memory and/or storage circuitry 106. Each routine may have multiple variants depending on "modes" that secure device manager 314 and the local sector manager 312 may be placed into when the memory and/or storage circuitry 106 is implemented as fixed read-only-memory (ROM). When the memory and/or storage circuitry 106 is implemented as random-access-memory (RAM), the RAM may be written with new routines to implement new operations and functionality into the sectors 302. This may provide usable extensibility in an efficient and easily understood way, which may be useful as new commands could bring about large amounts of local activity within the sector 302 at the expense of only a small amount of communication between the secure device manager 314 and the local sector manager 312.

Figure 4:
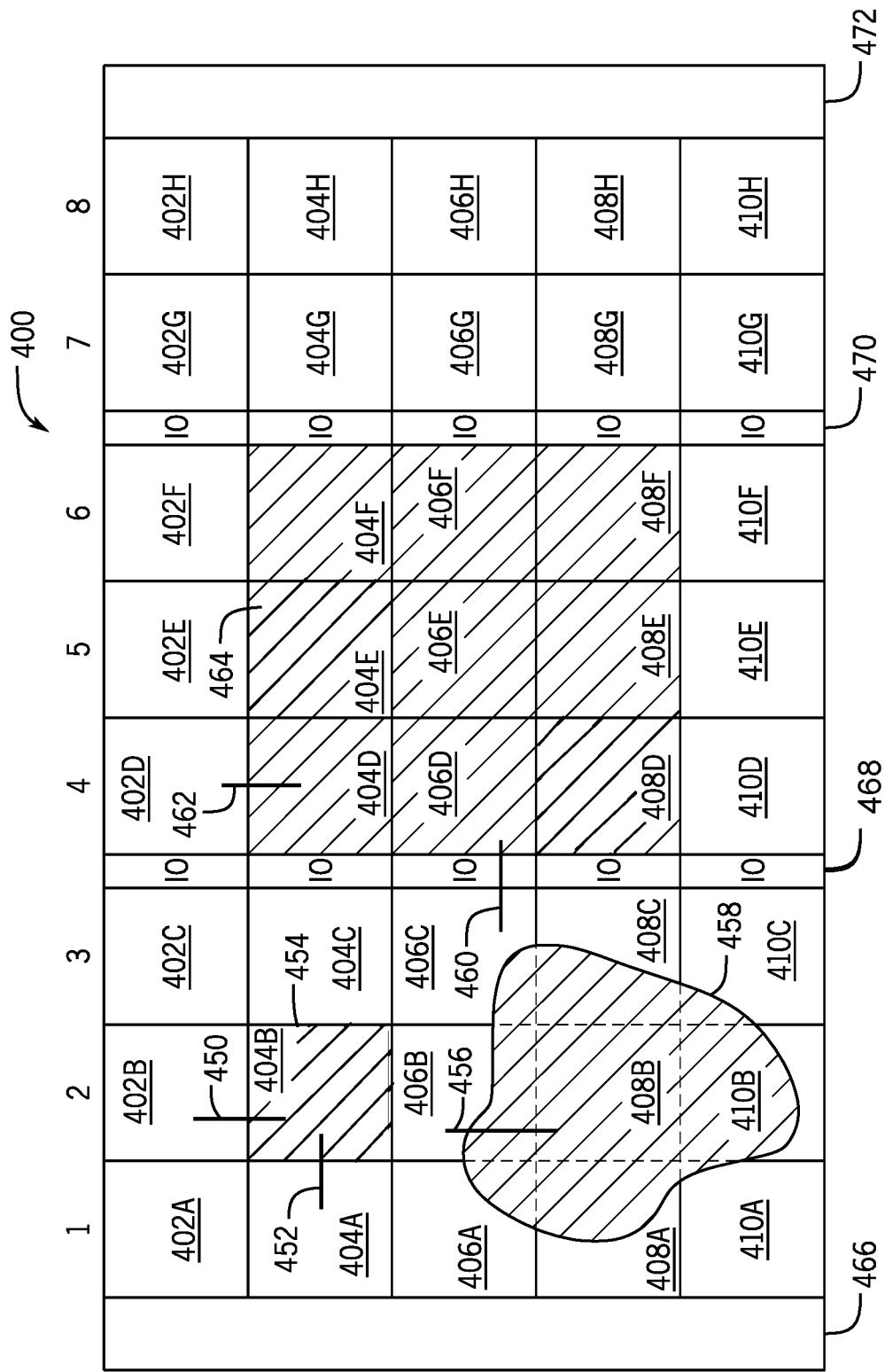
FIG. 4 is a schematic diagram of a programmable fabric of the programmable device of FIG. 2 including multiple partitions, in accordance with embodiments of the present disclosure.

The programmable fabric 400 of the programmable device 202 may include one or more partitions encompassing at least a portion of the one or more sectors 302, as shown in FIG. 4, in accordance with embodiments of the present disclosure. The programmable fabric 400 includes sectors 402A, 402B, 402C, 402D, 402E, 402F, 402G, 402H, collectively referenced as sectors 402A-402H, in a first row. Similarly, the programmable fabric 400 may contain sectors 404A-404H in a second row, sectors 406A-406H in a third row, 408A-408H in a fourth row, and sectors 410A-410H in a fifth row. As discussed above, any of the sectors in any row, collectively referenced as sectors 402A-410H, may include a logic grouping of logic elements of the programmable fabric 400. For example, each sector of the sectors 402A-410H may include logic elements (e.g., registers) that are each capable of performing or facilitating performance of similar tasks. For example, each sector 402A-410H may include data registers 316A, 316B that would be typically used in the programmable fabric 400 by each user or function.

Additionally or alternatively, some sectors of the sectors 402A-410H may be programmed to perform different tasks. In some embodiments, rows or columns of the sectors 402A-410H may be directed to different functions. For example, sectors 402A and 404A may be suitable for a first function (e.g., digital signal processing, multiplication, or the like) while other sectors 402B and 404B may be suitable for a second function (e.g., custom LUT-based functions). Each sector 402A-410H may also be configured to perform multiple functions. Moreover, each sector 402A-410H may include local resources, such as configurable random-access-memory (CRAM) cells, embedded RAM, magnetoresistive RAM, routing (e.g., wires, trace, and the like), registers, and/or clocking. In some embodiments, clocking may be shared between sectors 402A-410H. In such embodiments, the routing within each sector 402A-410H may be used to route clocking to relevant partitions using a clock signal received at the sector from outside the sector.

Although FIG. 4 discusses and illustrates forty sectors, various embodiments may include more and less sectors 402A-410H. Moreover, the programmable fabric 400 may include any suitable number of sectors 402A-410H. Indeed, in some embodiments, the programmable device 202 may be a non-sectored programmable device 202 and thus include only a single sector (e.g., sector 402A). As such, the disclosed programmable devices 202 may conceivably include any number of sectors 402A-410H from one to any number greater than one.

The programmable fabric 400 may also include global resources 466, 468, 470, and 472 that are shared between sectors 402A-410H and outside of the physical regions of sectors 402A-410H and/or partitions of the programmable fabric 400. The global resources 466, 468, 470, and 472 may include clock routing to each sector 402A-410H, phase lock loop (PLL) circuitry, input-output circuitry Peripheral Component Interconnect Express (PCIe) circuitry, hardware platform interfaces (HPIs), hard processor systems (HPSs), and/or any other suitable circuitry. The programmable fabric 400 may also include spanning resources that span physical partitions and/or sectors 402A-410H. These spanning resources may include at least a horizontal wire and/or a vertical wire utilized by a partition to transmit and/or receive data and/or output data. The spanning resources may also include scanning chains used for register readback from the partitions.

The programmable fabric 400 may also include partitions that may be directed to different functions, users, machines, permissions, or other divisions of the programmable device. As illustrated, some partitions (e.g., partition 454) are entirely within and fully encompass a sector, such as sector 404B. The partition 454 may utilize spanning resources 450 and 452 that extend into the partition 454 from sectors 402B and 404A, respectively. The programmable fabric 400 may include partitions (e.g., partition 464) that span multiple sectors 402A-410H, such as sectors 404D, 404E, 404F, 406D, 406E, 406F, 408D, 408E, and 408F. The partition 464 may utilize spanning resources 462 and 460. Some partitions (e.g., partition 458) extend beyond and/or do not fully encompass sectors 402A-410H in which the partition 458 is located. For example, the partition 458 fully encompasses sector 408B and partially encompasses sectors 406A, 406B, 406C, 408A, 408C, 410A, 410B, and 410C. As illustrated, the partition 458 may utilize spanning resource 456.

In some embodiments, a circuit design may modify the entire or at least a partition of the programmable fabric 400 using associated resources. For example, the partition 458 may be programmed via the associated resource (spanning resource) 456. The associated resources spanning the entire or at least a partition of the programmable fabric 400 to be configured may be managed by the system 100 to ensure that they are modified as intended by the configuration data. For example, the system 100 may ensure that the partition 458 is not modified during programming of partition 464 and its associated resources 460, 462 by the configuration data. During programming of the programmable device 202, the system 100 may use masks during read/modify/write sequences to define the resources and partitions of the programmable fabric 400 that are to remain unmodified. Further, the programmable device 202 may use a second set of masks (e.g., validation masks, ownership masks) to perform the on-device verification of the configuration data. The mask may, for example, identify the sectors (e.g., 404D-F, 406D-F, 408D-F) belonging to a target partition (e.g., the partition 464) and generate a mask that includes only these sectors while masking sectors (e.g., all sectors outside of 404D-F, 406D-F, 408D-F) outside of the target partition 464.

Figure 5:
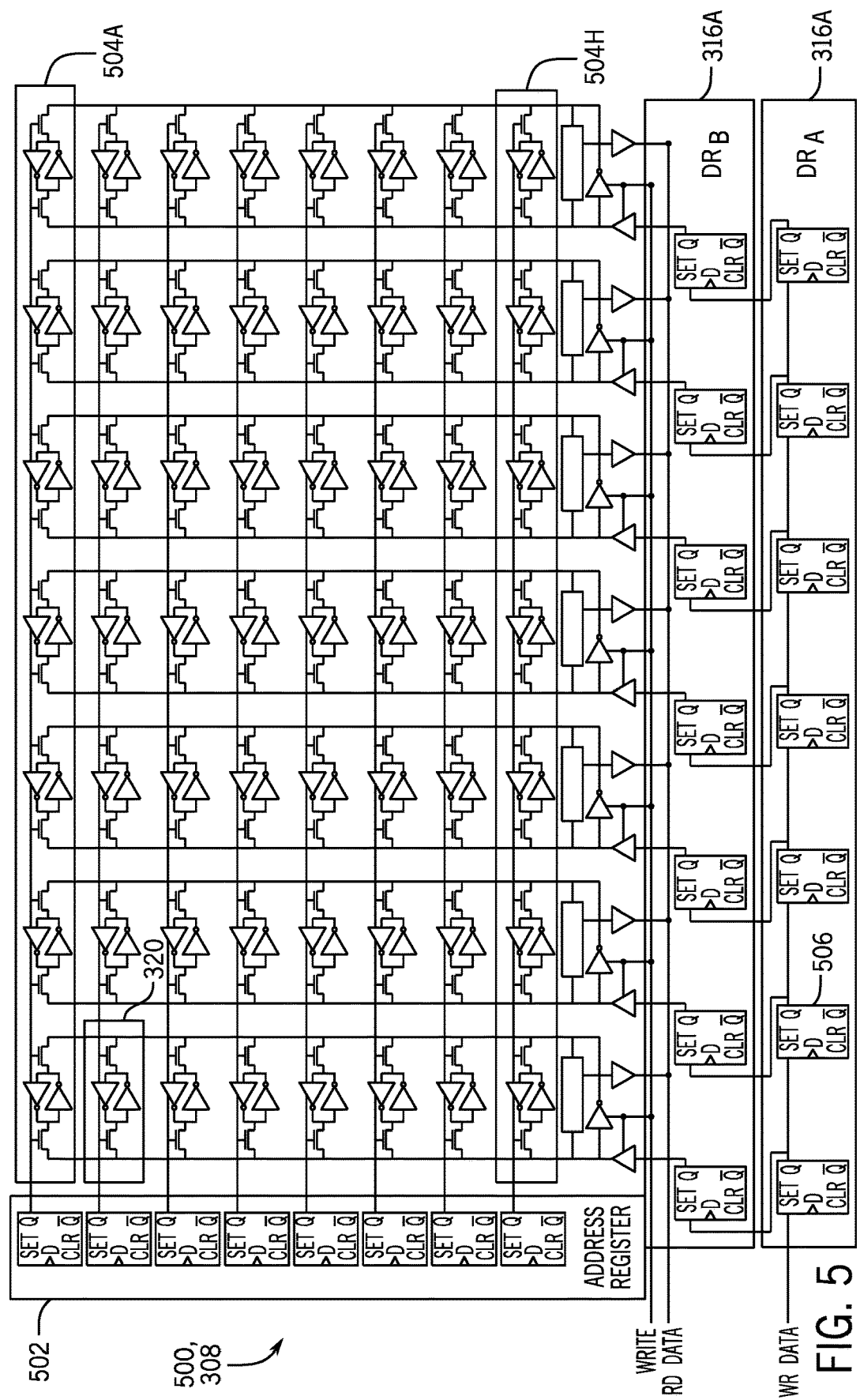
FIG. 5 is a schematic diagram of configuration memory of the programmable fabric of FIG. 4 including multiple memory frames, in accordance with embodiments of the present disclosure.

FIG. 5 illustrates configuration memory 500 of the programmable fabric 400 including multiple memory frames 504A-504H, in accordance with embodiments of the present disclosure. The configuration memory 500 shown may be one of many configuration memory 500 blocks in a sector 302 (e.g., may belong to a configurable logic block 310 of multiple configuration logic blocks 310 in the sector 302), the configuration memory 500 for an entire sector 302, the configuration memory 500 for a partition (e.g., partition 464), or the configuration memory 500 for the entire programmable fabric 400. Any number of memory frames 504A-504H and memory cells 320, greater or less than the number shown, may be used during implementation.

To program the configuration memory 500 with the configuration data, one or more memory frames 504A-504H may be chosen to store the configuration data by selecting the address associated with one or more memory frames 504A-504H. As such, the configuration memory 500 may include an address register 502 that controls access to one or more memory frames 504A-504H. For example, the address register 502 may receive an ADDRESS signal provided by the local sector manager 312 that activates an address line of a memory frame (e.g., memory frame 504A). Upon activating the address line, the data registers 316A and/or 316B may read (e.g., load) from or write (e.g., store) data to the memory frame 504A. The local sector module 312 may facilitate read and write operations by providing a memory write signal (WRITE), a memory read signal (RD DATA), and/or the data itself (WR DATA) to the data registers 316A, 316B.

In some embodiments, two data registers 316A and 316B may be used to read from and write data to one or more memory frames 504A-504H via logic circuitry, such as D-Latches 506, within the data registers 316A, 316B. The data registers 316A, 316B may be of the same bit length (e.g., 16 bits) as the bit length of each memory frame 504A-504H. Further, the logic circuitry of the data registers 316A, 316B may perform arithmetic operations such as AND, OR, XOR, NOT, ZERO OUT, and/or ANDINV, among others, on data stored or to be stored in the memory frames 504A-504H by loading the data into the data registers 316A, 316B. The arithmetic and Boolean operations allow for read/modify/write functionality so that individual bits of the data to be stored in the memory frame 504A may be modified without affecting other bits to be stored in the memory frame 504A. For example, an AND operation may be performed between data register 316A, which holds the loaded configuration data, and data register 316B, which holds a configuration mask, resulting in the preservation of configuration data associated with only the target partition. The configuration data associated with the target partition may then be loaded into configuration memory 500 from data register 316A such that memory frame bits associated with the target partition are modified while other memory frame bits remain unchanged.

Although two data registers 316A, 316B are shown, any number of data registers 316A, 316B may be used to read data from, write data to, and verify the configuration data held in configuration memory 500. In some embodiments, two data registers 316A, 316B may be advantageous when performing arithmetic validation checks on the configuration data. For example, the data register 316B may hold a copy of encrypted configuration data stored in the memory frame 504A while the data register 316A may hold a check value (e.g., the uncorrupted configuration data that should be stored in the memory frame 504A). In such instances, a designated logic operation may be performed between the data register 316A and the data register 316B, and hence between the encrypted configuration data copy and the check value, to verify that the programmable fabric 400 was programmed as intended without revealing the value of the configuration data itself.

The same circuitry, such as the data registers 316A, 316B, the local sector manager 312, and/or the secure device manager 314, used to configure the programmable fabric 400 or the partition(s) of the programmable fabric 400 may also be used to verify that the programmable fabric 400 or the partition(s) of the programmable fabric 400 were programmed as intended by the configuration data. For example, the programmable device 202 may verify that only the target partition (e.g., partition 458) was modified by the configuration data while leaving the remaining programmable fabric 400 unaffected or untouched (e.g., without changing the configuration data store in the remaining programmable fabric 400). Additionally or alternatively, the programmable device 202 may verify that certain bits of the target partition (e.g., partition 458) were not touched during partial configuration by the configuration data.

On-Device Configuration Validation of the Programmable Fabric

Figure 6:
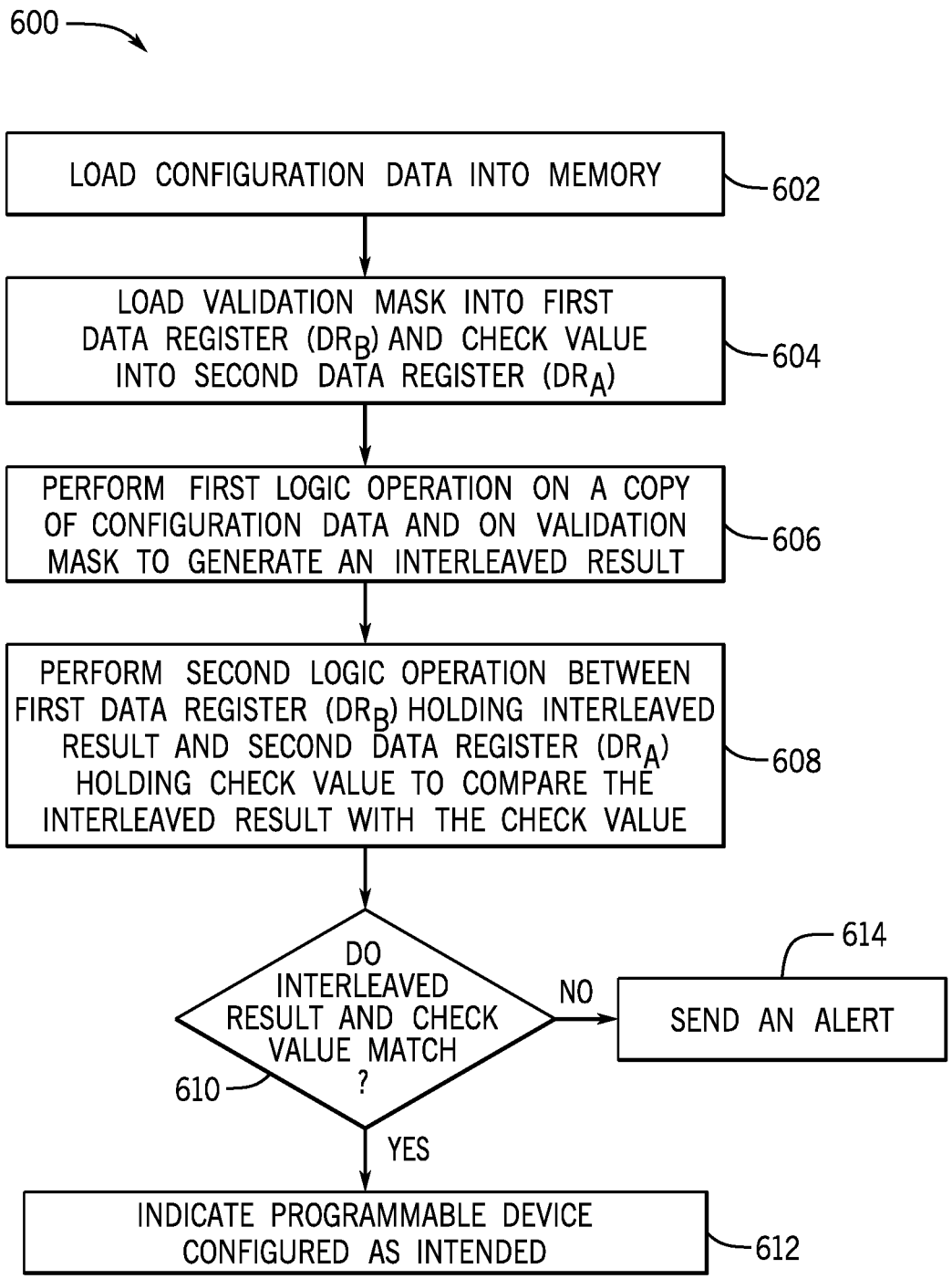
FIG. 6 is a flow diagram illustrating a process for on-device configuration validation of the programmable fabric of FIG. 4, in accordance with embodiments of the present disclosure.

FIG. 6 illustrates a process 600 for performing on-device configuration validation of the programmable fabric 400, in accordance with embodiments of the present disclosure. Generally, the process 600 includes loading the configuration data into the configuration memory 500 (process block 602), loading a validation mask into a first data register (e.g., data register 316B) and a check value into a second data register (e.g., data register 316A) (process block 604), performing a first logic operation on a copy of the configuration data and the validation mask held in the first data register to generate an interleaved result that is stored in the first data register (process block 606), performing a second logic operation between the first data register holding the interleaved result and the second data register holding the check value to compare the interleaved result with the check value (process block 608), determining whether the interleaved result and the check value match (decision block 610), indicating that the programmable device 202 is configured as intended if the interleaved result and the check value match (process block 612), and sending an alert if the interleaved result and the check value do not match (process block 614).

The process 600 may perform the on-device configuration validation by using the configuration hardware paths used to program the programmable device 202. For example, the local sector manager 312 may coordinate logic hardware (e.g., registers) to perform the on-device configuration check of the process 600. Specifically, the local sector manager 312 may determine or receive the type of on-device validation check that will verify that the programmable fabric 400 of the programmable device 202 was programmed as intended. Additionally, the secure device manager 314 may generate and/or transmit secure versions of the validation mask and the check value to the local sector manager 312. In some embodiments, the secure device manager 314 may generate secure versions of the masks and configuration data by encrypting and authenticating the masks and configuration data via AES encryption blocks, SHA2 encryption blocks, ECDSA encryption blocks, encryption key management, and the like.

The process 600 may be performed by any suitable device or combination of devices that may be programmed using the configuration data and may perform the on-device validation checks. While the process 600 is described in a specific sequence, it should be understood that the present disclosure contemplates that the described process 600 may be performed in different sequences than the sequence illustrated, and certain portions of the process 600 may be skipped or not performed altogether. In some embodiments, at least some portions of the process 600 may be implemented by a host processor 104. In alternative or additional embodiments, at least some parts of the process 600 may be implemented by any other suitable components or control logic, such as the local sector manager 312, the secure device manager 314, and the like.

Thus, in some embodiments, the local sector manager 312 may load the configuration data into the configuration memory 500 (process block 602). As discussed above, the address register 502 may use an ADDRESS signal provided by the local sector manager 312 to select the memory frame (e.g., memory frame 504A) that the configuration data will be loaded into. The configuration data may be loaded into the data register (e.g., data register 316B) using the WR DATA signal. Upon receiving the WRITE signal, the data register 316B may write the configuration data to the selected memory frame 504A.

The local sector manager 312 may then load the validation mask into a first data register (e.g., the data register 316B) and the check value into a second data register (e.g., the data register 316A) (process block 604). The secure device manager 314 may generate a secure version of the validation mask based on the association of each bit of the validation mask with the programmable fabric 400. For example, bits of the validation mask that are associated with the configuration memory 500 of the programmable fabric 400 may hold a value of one. The check value may be the configuration data expected to be stored in the selected memory frame 504A. In some embodiments, the data register 316B may hold the validation mask to facilitate interleaving of the configuration data and the validation mask. The data register 316A may in turn store the check value. Additionally or alternatively, the secure device manager 314 may transmit the secure version of the validation mask to the local sector manager 312 for implementation of the on-device configuration validation check.

The local sector manager 312, upon receiving instructions from the secure device manager 314 and/or the host processor 104, may interleave a copy of the configuration data and the validation mask. The local sector manager 312 may then store the interleaved results in, for example, the first data register (e.g., data register 316B) (process block 606). In particular, a copy of the configuration data held in memory 500 may be generated by reading the configuration data from memory. The copy of the configuration data may then be interleaved with the validation mask held in the first data register by performing a first logic operation on the copy of the configuration data and the validation mask. This interleaved result may then be stored in the first data register to facilitate the remaining parts of the validation check. For example, the local sector manager 312 may signal that an AND bit-wise parallel operation be performed on the configuration data and the validation mask by, for example, the first data register to filter out data that are not of interest (e.g., filter out the data in the memory frame that is not the configuration data). The interleaved result may then be stored in data register 316A.

Further, a second logic operation may be performed between data register 316B holding the interleaved result and data register 316A holding the check value to compare the interleaved result against the check value (decision block 608) to determine whether the programmable device 202 was configured as intended (decision block 610). If the local sector manager 312 determines that the interleaved result and the check value match, then the local sector manager 312 may indicate to the secure device manager 314 and/or the host processor 104 that the programmable device 202 was configured as intended (process block 612). For example, an XOR operation may be performed between the first data register holding the interleaved result and the second data register holding the check value to yield a comparison result of all zeros, indicating that the programmable device 202 was indeed configured as intended. When the interleaved result and the check value do not match, the local sector manager 312 may send an alert to the secure device manager 314 and/or the host processor 104 indicating that the programmable device 202 was not configured as intended, to stop further configuration of the programmable fabric 400, and/or to request reconfiguration of the programmable fabric 400 (process block 614).

Figure 7:
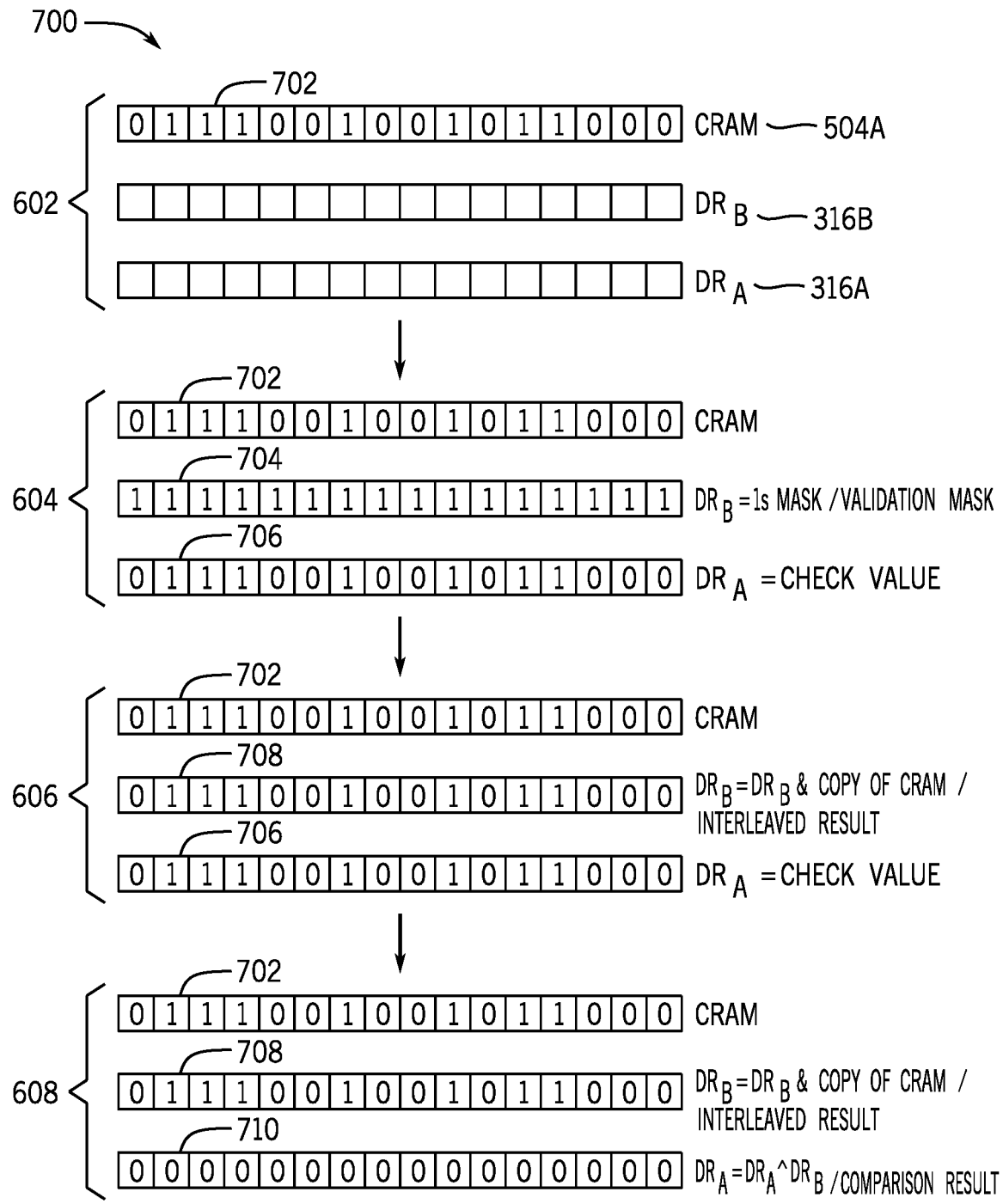
FIG. 7 illustrates an example bit diagram of the process of FIG. 6 implemented by configuration hardware of the programmable device of FIG. 2, in accordance with embodiments of the present disclosure.

FIG. 7 illustrates an example bit diagram 700 of the process 600 as performed by the configuration hardware of the FPGA 300, in accordance with embodiments of the present disclosure. The example components include a frame of configuration memory (e.g., memory frame 504A), a first data register $DR_A$ (e.g., data register 316A), and a second data register $DR_B$ (e.g., data register 316B). As shown, the local sector manager 312 may load the configuration data 702 in the frame of configuration memory 504A selected by the address register (e.g., address register 502) during configuration, as described in the process block 602 of FIG. 6. The secure device manager 314 may generate or receive the validation mask 704 and the check value 706, which are subsequently transmitted to the local sector manager 312 along with an indication to perform the on-device configuration validation of entire programmable fabric 400. Additionally or alternatively, the configuration data 702 loaded into the memory frame 504A may enable appropriate firmware on the local sector manager 312 to facilitate the on-device configuration validation check.

The validation mask 704 may be loaded into the data register $DR_B$ 316B while the check value 706 is loaded into the data register $DR_A$ 316A, as described in the process block 604 of FIG. 6. In this example, the validation mask 704 is a mask of ones allowing all information (e.g., copy of configuration data 702) to pass through. For example, all bits of the configuration memory frame 504A are passed through, enabling verification of all the configuration data 702 of the memory frame 504A that programmed the programmable device 202. The check value 706 is the uncorrupted configuration data that should have been stored into the memory frame 504A if the programmable device 202 was configured as intended.

The local sector manager 312 may interleave the validation mask 704 and the copy of configuration data generated by reading the configuration data by performing the AND bit-wise parallel operation on the validation mask 704 and the configuration data copy. The local sector manager 312 may also store the interleaved result 708 in the data register $DR_B$ 316B, as described in process block 606 of FIG. 6. For example, the interleaved result 708 is a copy of the configuration data 702 stored in the memory frame 504A since the validation mask 704 was a mask of all ones, allowing all data to pass through. The local sector manager 312 may compare the interleaved result 708 with the check value 706 stored in the data register $DR_A$ 316A by performing an XOR bit-wise operation between the $DR_B$ and the $DR_A$ (e.g., on the interleaved result 708 and the check value 706) that generates the comparison result 710, as described in process block 608 of FIG. 6. The local sector manager 312 may store the comparison result 710 in the data register $DR_A$ 316A and may verify that the comparison result 710 is as expected (e.g., includes all zeros), as would be the case if the programmable device 202 had been configured as intended.

Although the example 700 depicts the process 600 carried out through certain registers (e.g., the data registers 316A, 316B), certain masks (e.g., the validation mask 704), check values (e.g., the check value 706), and logic operations, any combination of configuration hardware, masks, check values, and logic operations may be used to implement on-device configuration validation. For example, the validation mask 704 may comprise both zeros and ones to check whether subsets within the memory frame 504A have been set correctly. Thus, the memory frame 504A may be filtered into two or more subsets that may be independently verified. Further, while the example 700 shows the configuration validation check for a single memory frame 504A, the process 600 may be repeated to check multiple memory frames 504A, such as when verifying the configuration of the entire programmable fabric 400. Additionally, it should be noted that the same configuration hardware used to configure the programmable device 202 may be used to perform the on-device configuration validation checks. For example, the local sector manager 312 may perform the comparison between the interleaved result 708 and the check value 706 instead of writing configuration data 702 into the memory frame 504A. This allows the check value 706 to remain secure (e.g., signed, encrypted, compressed) since the on-device configuration validation check uses the same designated pathway that programs the programmable device 202. This is advantageous when the check value 706 is expected to be the configuration data value, as illustrated in the example 700, since a secure check value 706 may be loaded onto the programmable device 202 by a central authority without revealing the values of the configuration data 702.

On-Device Partial Configuration Validation of the Target Partition

Figure 8:
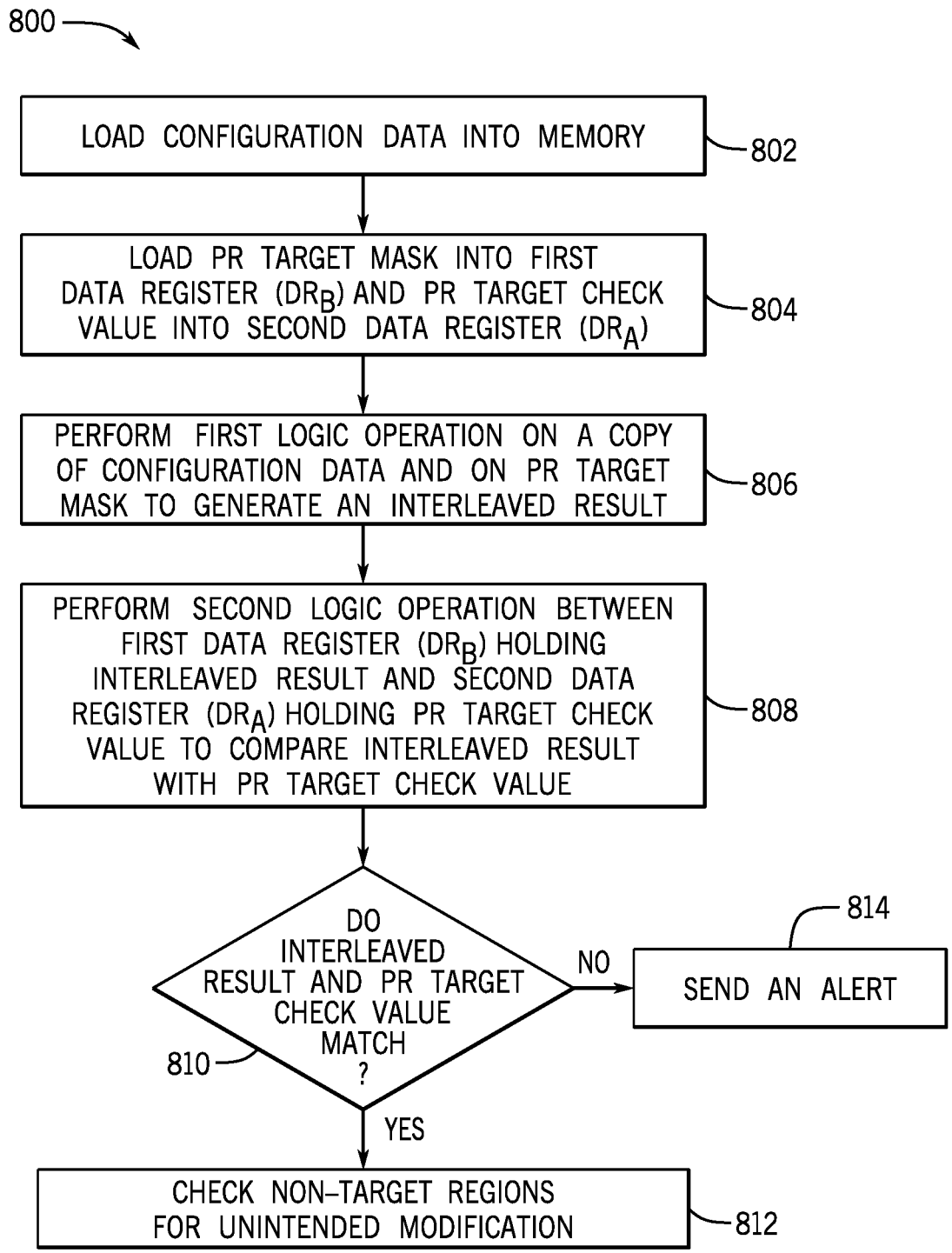
FIG. 8 is a flow diagram illustrating a process for on-device partial configuration validation of a target partition of the programmable fabric of FIG. 4, in accordance with embodiments of the present disclosure.

On-device validation checks may also be performed to verify that the target partition of the programmable device 202 was partially configured as intended, as described in process 800 of FIG. 8, in accordance with embodiments of the present disclosure. Generally, the process 800 includes loading the configuration data into configuration memory 500 (process block 802), loading partial configuration (PR) target mask into a first data register (e.g., the data register 316B) and a PR target check value into a second data register (e.g., the data register 316A) (process block 804), performing a first logic operation on a copy of the configuration data and on the PR target mask to generate an interleaved result that is stored in the first data register (process block 806), performing a second logic operation between the first data register holding the interleaved result and the second data register holding the PR target check value to compare the interleaved result against the PR target check value (process block 808), determining whether the interleaved result and the PR target check value match (decision block 810), checking non-target regions (e.g., non-target PR regions/static regions) for unintended modification by the configuration data when the target partition was programmed (process block 812), and sending an alert if the interleaved result and the PR target check do not match (process block 814).

The on-device configuration validation described by the process 800 may use the configuration hardware paths used to program the programmable device 202. For example, the local sector manager 312 may coordinate logic hardware (e.g., registers) to perform the on-device partial configuration validation of the process 800. Specifically, local sector manager 312 may determine the type of the on-device validation check that will be performed to verify that the programmable fabric 400 was programmed as intended. Additionally, the secure device manager 314 may generate and/or transmit the PR target mask and the PR target check value to the local sector manager 312. For example, the secure device manager 314 may determine the target partition to verify and the sectors 302 associated with the target partition. Based on the sectors 302 encompassed by the target partition, the PR target mask may filter out the configuration data not associated with the target partition.

The process 800 may be performed by any suitable device or combination of devices that may be programmed using the configuration data and may perform the on-device validation checks. While the process 800 is described in a specific sequence, it should be understood that the present disclosure contemplates that the described process 800 may be performed in different sequences than the sequence illustrated, and certain portions of the process 800 may be skipped or not performed altogether. In some embodiments, at least some portions of the process 800 may be implemented by a host processor 104. In alternative or additional embodiments, at least some parts of the process 800 may be implemented by any other suitable components or control logic, such as the local sector manager 312, the secure device manager 314, and the like.

Thus, in some embodiments, the local sector manager 312 may load the configuration data into the configuration memory 500 (process block 802). As discussed above, the address register 502 may use an ADDRESS signal provided by the local sector manager 312 to select the memory frame (e.g., memory frame 504A) that the configuration data will be loaded into. The local sector manager 312 may load the configuration data into the data register (e.g., data register 316B) using the WR DATA signal, and upon receiving the WRITE signal, the local sector manager 312 may signal the data register (e.g., data register 316B) to write the configuration data to the selected memory frame 504A. The local sector manager 312 may then load the PR target mask and the PR target check value into separate data registers 316A, 316B (process block 804).

The secure device manager 314 may generate the PR target mask based on association of each bit of the PR target mask with the target partition of the programmable fabric 400. For example, bits of the PR target mask associated with non-target partitions may hold low bit values (e.g., zeros) while bits associated with the target partition may hold high bit values (e.g., ones) when the memory frame 504A spans multiple sectors 302 and thus, possibly multiple partitions. The PR target check value may be the configuration data expected to be stored in the selected memory frame 504A or portion of the memory frame 504A used to configure the target partition. In some embodiments, the local sector manager 312 may store the PR target mask in the data register 316B to facilitate interleaving of the configuration data and the PR target mask. The local sector manager 312 may then load the PR target check value in another data register, such as data register 316A.

The local sector manager 312, upon receiving instructions from the secure device manager 314 and/or the host processor 104, may then interleave a copy of the configuration data and the PR target mask and store the results in, for example, the data register 316B (process block 806). In particular, the copy of the configuration data held in memory 500 may be generated by reading the configuration data from memory. The local sector manager 312 may then interleave the copy of the configuration data and the PR target mask held in the first data register by performing a first logic operation on the copy of the configuration data and the PR target mask. For example, the local sector manager 312 may signal that an AND bit-wise parallel operation be performed on the configuration data and the PR target mask to filter out data not of interest (e.g., filter out configuration data held in the memory frame 504A that is not associated with the target partition). That is, a subset of a memory frame 504A may be filtered out by the PR target mask such that configuration data used to configure only the target partition may be compared to the expected configuration data value. The interleaved result may then be stored into data register 316B.

Further, the local sector manager 312 may compare the interleaved result and the PR target check value held in, for example, data registers 316B and 316A respectively (decision block 808) to determine whether the portion of the programmable device was partially configured as intended (decision block 810). For example, the local sector manager 312 may perform the XOR bit-wise operation between the first data register holding the interleaved result and the second data register holding the PR target value to yield the comparison result of all zeros. If the interleaved result and the PR target check match (e.g., the comparison result is as expected, comparison result is all zeros), the local sector manager 312 may check non-target regions (e.g., non-target partitions/static regions) for unintended modification by the configuration data during partial configuration, as will be discussed in more detail below (process block 812). In some embodiments, local sector manager 312 may indicate that the programmable device 202 is configured as intended. When the interleaved result and the PR target check value do not match, the local sector manager 312 may send an alert to the secure device manager 314 and/or the host processor 104 stop further programming of the programmable fabric 400 and/or to request partial reconfiguration of the target partition (process block 814).

Figure 9:
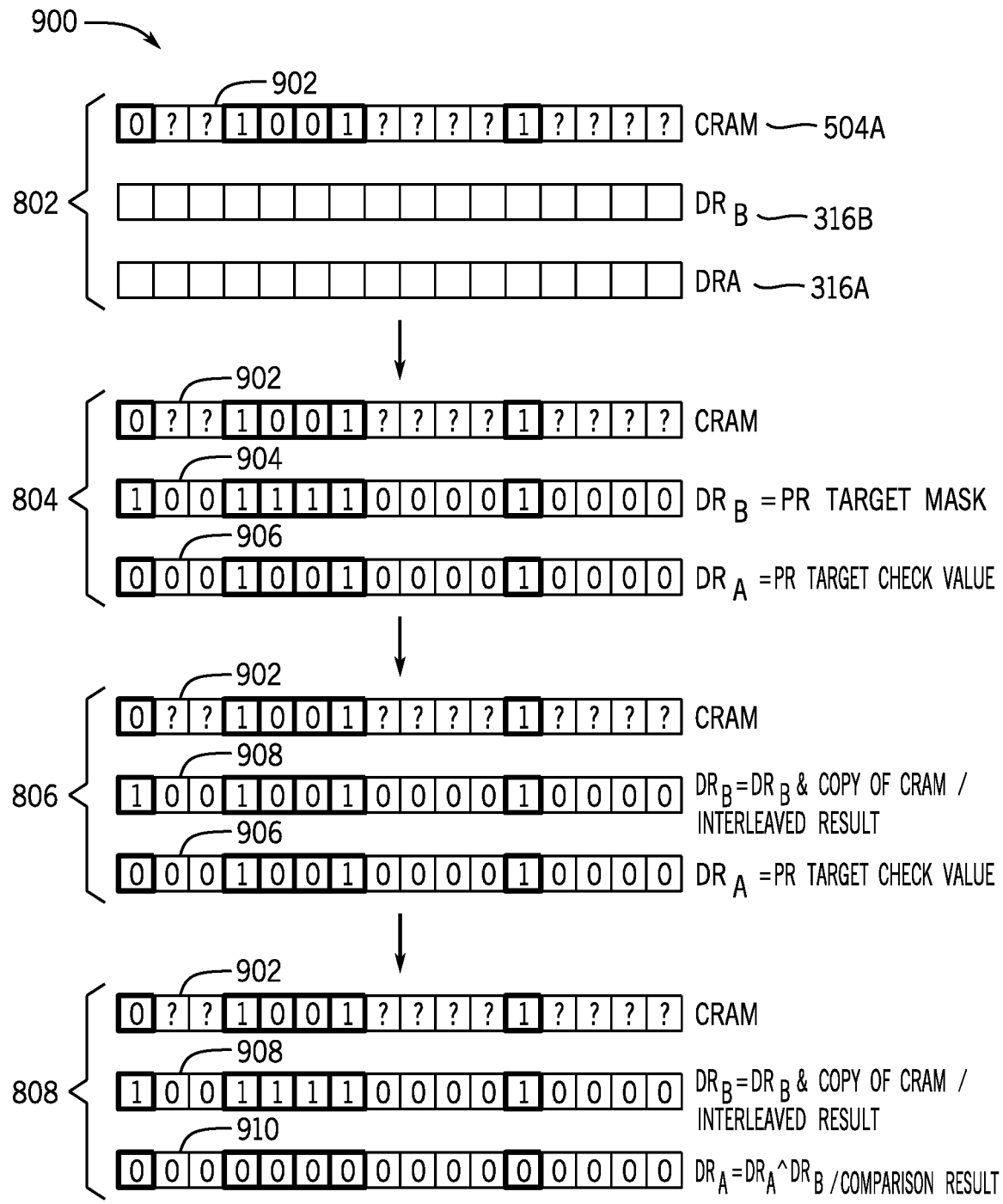
FIG. 9 is an example bit diagram of the process of FIG. 8 implemented by the configuration hardware of the programmable device of FIG. 2, in accordance with embodiments of the present disclosure.

FIG. 9 illustrates an example bit diagram 900 of process 800 as performed by the configuration hardware of the FPGA 300, in accordance with embodiments of the present disclosure. As shown, the local sector manager 312 may load configuration data 902 into a frame of configuration memory (e.g., memory frame 504A) selected by the address register (e.g., address register 502) during configuration, as described in the process block 802 of FIG. 8. The configuration data 902 associated with the target partition is shaded. The secure device manager 314 may generate or receive the PR target mask 904 and the PR target check value 906, which are subsequently transmitted to the local sector manager 312 along with an indication to perform the on-device partial configuration validation of the target partition. Additionally or alternatively, the configuration data 902 loaded into the memory frame 504A may enable appropriate firmware on the local sector manager 312 to facilitate the on-device partial configuration validation check.

The local sector manager 312 may load the PR target mask 904 into the data register $DR_B$ 316B while the PR target check value 906 is loaded into the data register $DR_A$ 316A, as described in process block 804 of FIG. 8. In this example, the PR target mask 904 holds high bit values (e.g., ones) in those bits that are associated with the target partition. That is, the PR target mask 904 bits that will interleave with bits of a copy of the configuration data hold high bit values to allow information (e.g., copy of the configuration data) associated with the target partition to pass through. For example, the PR target mask 904 bits that correspond to the configuration data bits 902 of the memory frame 504A associated with the target partition have high bit values. The PR target check value 906 is the uncorrupted configuration data that should have been stored into the memory frame 504A associated with the target partition if the partial configuration occurred as intended. The uncorrupted configuration data (e.g., PR target check value 906) associated with the target partition is also shaded. The remaining bits of the PR target check value 906 may hold low bit values as they are not associated with the target partition.

The local sector manger 312 may interleave the PR target mask 904 and the copy of configuration data by performing a logic operation, such as the AND bit-wise parallel operation, on the PR target mask 904 and the copy of the configuration data. For example, the interleaved result 908 is a copy of the configuration data 902 associated with the target partition since the PR target mask 904 filtered out the configuration data 902 associated with non-target regions. The local sector manager 312 may store the interleaved result 908 into the data register $DR_B$, as described in the process block 806 of FIG. 8.

The local sector manager 312 may compare the interleaved result 908 stored in the data register $DR_B$ 316B with the PR target check value 906 stored in the data register $DR_A$ 316A by performing an XOR bit-wise operation between the $DR_B$ and the $DR_A$ (e.g., the PR target check value 906 and the interleaved result 908), as described in process block 806 of FIG. 8. The local sector manager 312 may store the comparison result 910 in the data register $DR_A$ 316A and may verify that the comparison result 910 is as expected (e.g., all zeros), as would be the case if the target partition had been partially configured by the configuration data at intended.

Although this example 900 depicts the process 800 carried out through certain registers (e.g., data registers 316A, 316B), with certain masks (e.g., PR target mask 904), check values (e.g., PR target check value 906), and logic operations, any combination of configuration hardware, masks, check values, and logic operations may be used to execute on-device configuration validation. For example, the PR target mask 904 may comprise all ones when the memory frame 504A belongs entirely to the target partition. Further, while example 900 shows the partial configuration validation check for a single memory frame 504A, the process 800 may be repeated to check multiple memory frames 504A, such as when the target partition has two or more memory frames 504A associated with it. Additionally, it should be noted that the same configuration hardware used to partially configure the programmable device 202 may be used to perform the on-device partial configuration validation checks. For example, the local sector manager 312 may perform the comparison between the interleaved result 908 and the PR target check value 906 instead of writing the configuration data 902 into the memory frame 504A. This allows the PR target check value 906 to remain secure (e.g., signed, encrypted, compressed) since the on-device configuration validation check uses the designated configuration pathway. This is advantageous when the PR target check value 906 is expected to be the configuration data value 902, as in the example 900, since a secure PR target check value 908 may be loaded onto the programmable device 202 by the central authority without revealing the value of configuration data 902.

On-Device Partial Configuration Validation of Non-Target Regions

Figure 10:
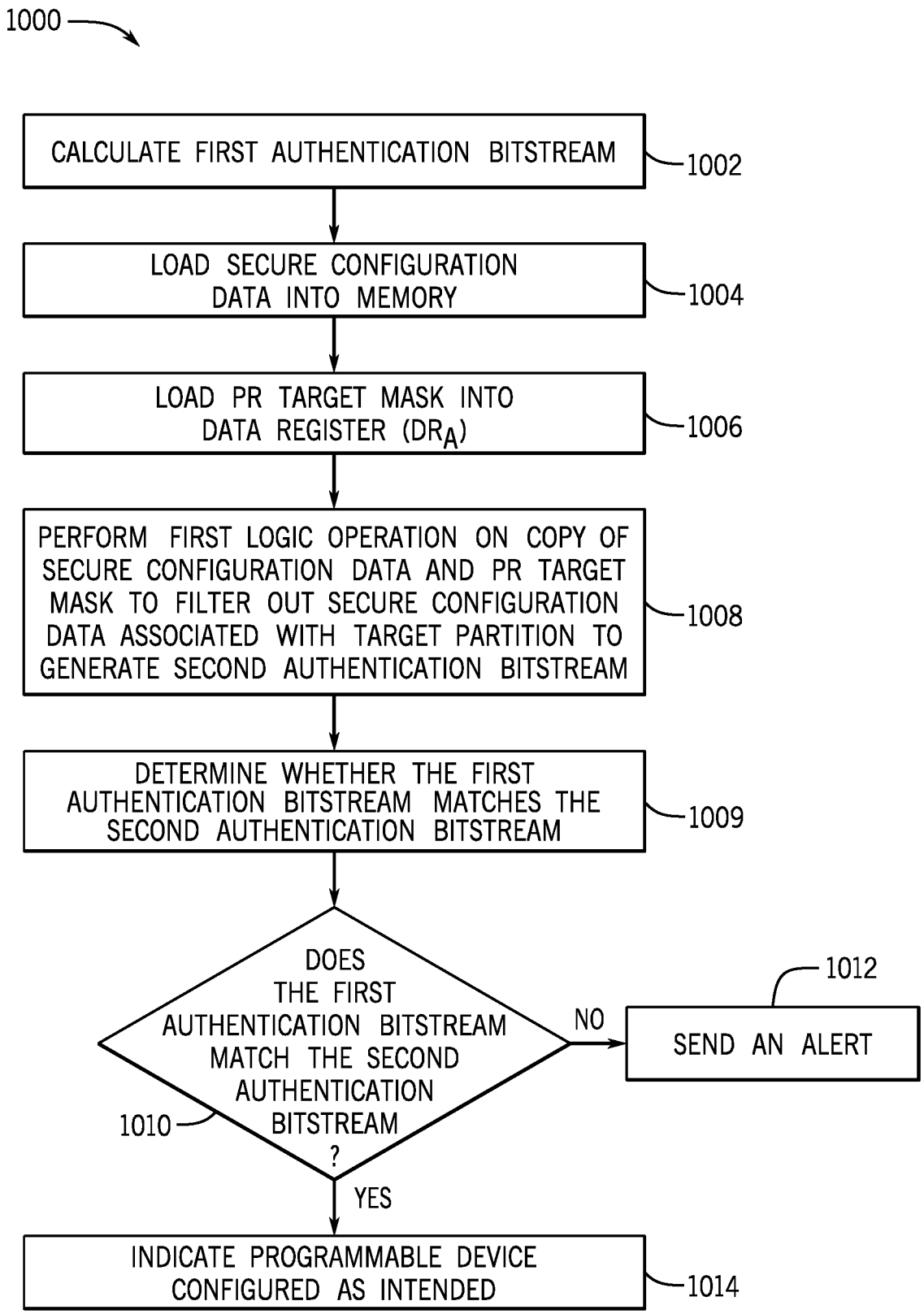
FIG. 10 is a flow diagram illustrating a process for on-device partial configuration validation of non-target regions of the programmable fabric of FIG. 4, in accordance with embodiments of the present disclosure.

The programmable fabric 400 may include one or more static regions and/or non-target partitions that are to remain unmodified during programming of the target partition(s). However, when the configuration data is corrupted, other non-target partitions and/or static regions, collectively non-target regions, may be modified. As such, FIG. 10 illustrates a process 1000 for on-device partial configuration validation of non-target regions of the programmable fabric 400, in accordance with embodiments of the present disclosure. Generally, the process 1000 includes calculating the first authentication bitstream (process block 1002), loading secure configuration data into configuration memory 500 (process block 1004), loading the PR target mask into the data register (e.g., data register 316B) (process block 1006), performing a logic operation on a copy of the secure configuration data and the PR mask to filter out the secure configuration data associated with the target partition, thereby generating the second authentication bitstream (process block 1008), determining whether the first authentication bitstream matches the second authentication bitstream (process block 1009), sending an alert if the first authentication bitstream matches the second authentication bitstream (process blocks 1010 and 1012), and indicating that the programmable device 202 was partially configured as intended if the expected comparison result was obtained (process blocks 1010 and 1014).

The on-device partial configuration validation of non-target regions described by process 1000 may use the same configuration hardware paths used in programming the programmable device 202. For example, the local sector manager 312 may coordinate logic hardware (e.g., registers) to perform the on-device partial configuration validation of process 1000. Specifically, the local sector manager 312 may determine the type of on-device validation check that will be performed to verify that the programmable fabric 400 was programmed as intended. Additionally, the secure device manager 314 may generate and/or transmit the PR target mask and the configuration data to the local sector manager 312. For example, the secure device manager 314 may determine the non-target region(s) to verify and the sectors 302 associated with the non-target region(s). Further, the secure device manager 314 may generate the PR target mask based on the relationship between the non-target region(s) and the sectors 302. For example, the PR target mask may filter out the configuration data stored in sectors 302 associated with the target partition.

The process 1000 may be performed by any suitable device or combination of devices that may be programmed using the configuration data and that may perform the on-device validation checks. While the process 1000 is described in a specific sequence, it should be understood that the present disclosure contemplates that the described process 1000 may be performed in different sequences than the sequence illustrated, and certain portions of the process 1000 may be skipped or not performed altogether. In some embodiments, at least some portions of the process 1000 may be implemented by the host processor 104. In alternative or additional embodiments, at least some parts of the process 1000 may be implemented by any other suitable components or control logic, such as the local sector manager 312, the secure device manager 314, and the like.

Thus, in some embodiments, the secure device manager 314 and/or the host processor 104 may calculate the first authentication bitstream (process block 1002). The first authentication bitstream may be a linear feedback shift register (LFSR) value that is based on uncorrupted configuration data that should be stored within the non-target regions of memory 500 if the programmable device 202 was programmed as intended. The first authentication bitstream may be calculated for a single memory frame, across a row of frames, for an entire sector, and/or for all the non-target regions. Additionally, the first authentication bitstream may be calculated before the process 800 begins or right before process 1000 begins. In particular, the secure device manager 314 and/or the uncorrupted configuration bitstream may indicate to the local sector manager 312 to calculate the first authentication bitstream. A secure version (e.g., plaintext secure form) of the uncorrupted configuration bitstream may be provided to the local sector manager 312 by the secure device manager 314 and may correspond to the configuration bitstream that will be stored in one memory frame, multiple memory frames, in a single sector, or throughout the non-target regions. Additionally, to preserve the value of the configuration data associated with the non-target regions, the secure device manager 314 may generate the secure version on an already encrypted version of the configuration data.

In some embodiments, the local sector manager 312 may generate the first authentication bitstream by performing a logic operation on the PR target mask and the secure version of the uncorrupted configuration bitstream such that configuration data associated with the target partition(s) is filtered out. The local sector manager 312 may then store the first authentication bitstream in its memory. Because the same configuration hardware used to program the programmable device 202 may generate the first authentication bitstream, the first authentication bitstream may be used in subsequent validation checks to securely validate whether the configuration data in the configuration memory 500 was stored as expected. Further, by storing the first authentication bitstream in the local sector manager 312, the value of the first authentication bitstream remains secure and ready for quick access during on-device partial configuration validation check of non-target regions.

The local sector manager 312 may then load the secure configuration data into the configuration memory 500, such as during partial configuration of the programmable device 202 (process block 1004). As mentioned above, the value of the configuration data may remain unknown throughout programming (e.g., may be encrypted beforehand) and throughout the on-device partial configuration validation of the non-target region(s). The address register 502 may use an ADDRESS signal provided by the local sector manager 312 to select the memory frame 504A that will store the secure configuration data. The local sector manager 312 may load the secure configuration data into the data register (e.g., data register 316B) using the WR DATA signal and upon receiving the WRITE signal, the local sector manager 312 may signal the data register 316B to write the secure configuration data to the selected memory frame 504A.

The local sector manager 312 may subsequently load the PR target mask into the data register (e.g., data register 316A) (process block 1006). The secure device manager 314 may generate the PR target mask, for example, based on the association of each bit of the PR target mask with configuration memory 500 bits corresponding to the target partition(s) and non-target region(s). For example, bits of the PR target mask associated with non-target regions may hold low values (e.g., zeros) while bits associated with target partitions may hold high values (e.g., ones) when the memory frame 504A spans multiple sectors 302 and thus, possibly multiple partitions.

The local sector manager 312, upon receiving instructions from the secure device manager 314 and/or the host processor 104, may perform a logic operation on a copy of the configuration data stored in memory 500 and the PR mask held in the data register to filter out the secure configuration data associated with the target partition and thereby generate a second authentication bitstream (process block 1008). For example, the local sector manager 312 may signal that an AND-INV bit-wise parallel operation be performed on a copy of the secure configuration data and the PR target mask to filter out data not of interest (e.g., secure configuration data associated with the target partition). The result is a second authentication bitstream which may be a second LFSR value associated with the non-target region(s). The local sector manager 312 may store the second authentication bitstream into the data register 316A for easy access and for security purposes since data registers 316A, 316B provide local read-back functionality.

The configuration hardware may determine whether the second authentication bitstream matches the first authentication bitstream (process block 1009). In other words, the configuration hardware may determine whether the configuration data stored in the non-target region(s), as represented by the second authentication bitstream, is the same as the uncorrupted configuration data that should be stored in the non-target region(s), as represented by the first authentication bitstream. The determination may be done in a number of ways. For example, the first authentication bitstream and the second authentication bitstream may be shifted bit by bit from the local sector manager 312, in which they are stored, to a respective data register, such as into data register 316B for the first authentication bitstream and into data register 316A for the second authentication bitstream. A bit-wise XOR operation may be performed between the corresponding bits of the first authentication bitstream and the second authentication bitstream held in data registers 316B and 316A, respectively. By shifting the authentication bitstreams into the data registers, the authentication bitstream lengths' may be independent of the bit-length of the data registers, thereby enabling validation of any authentication bitstream length. Additionally, the determination may be done in the local sector manager 312, which stores both authentication bitstreams in its memory, or in the secure device manager 314.

Regardless of the method used to determine whether the first authentication bitstream matches the second authentication bitstream, the configuration hardware may then determine whether the expected result was obtained (process block 1010). If the authentication bitstreams do not match, the local sector manager 312 may send an alert to stop further programming of the programmable fabric 400 and/or to request partial reconfiguration of the target partition (process block 1012). If the authentication bitstreams do match, the local sector manager 312 an send an indication signaling that non-target region(s) remained untouched during partial configuration and that the programmable device 202 was partially configured as intended (process block 1014).

Figure 11:
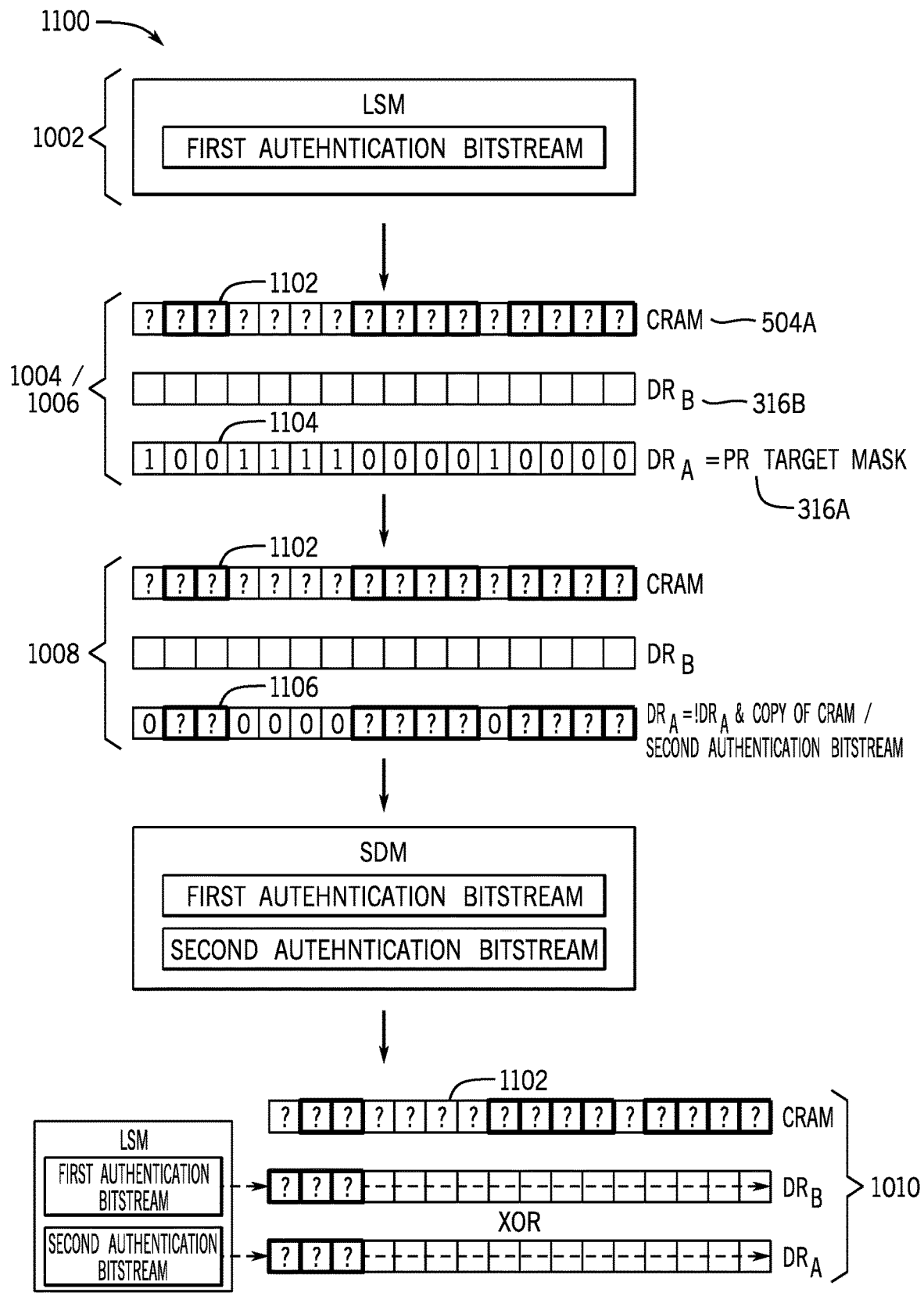
FIG. 11 is an example bit diagram of the process of FIG. 10 implemented by the configuration hardware of the programmable device of FIG. 2, in accordance with embodiments of the present disclosure.

FIG. 11 illustrates an example bit diagram 1100 of the process 1000 as performed by the configuration hardware of the FPGA 300, in accordance with embodiments of the present disclosure. As shown, the local sector manager 312 may store the first authentication bitstream once it has been calculated based on the uncorrupted version of the configuration data, as described in process block 1002 of FIG. 10. As will be mentioned in more detail, the first authentication bitstream is calculated in a similar manner as the second authentication bitstream. Further, the local sector manager 312 may store the secure configuration data 1102 into configuration memory 500 and may load the PR target mask 1104 into the data register $DR_A$ (e.g., data register 316A), as described in the process blocks 1004 and 1006 of FIG. 10.

The secure configuration data's values 1102 are unknown, as shown by the "?", however the bits holding secure configuration data 1102 associated with the non-target region(s) are known (i.e., outlined). As discussed above, the value of the secure configuration data 1102 may remain hidden to protect proprietary information from, for example, the central authority. The secure device manager 314 may generate or receive the PR target mask 1104, which is subsequently transmitted to the local sector manager 312 along with an indication to perform the on-device partial configuration validation of the non-target region(s). Additionally or alternatively, the secure configuration data 1102 loaded onto the programmable device 202 may carry information to enable appropriate firmware on the local sector manager 312 for on-device partial configuration validation checking.

In this example, the PR target mask 1104 holds high bit values (e.g., ones) in those bits associated with the target partition and low bit values (e.g., zeros) in those bits associated with the non-target regions. Based on the logic operation, the PR target mask 1104 bits that hold high bit values will filter out the secure configuration data 1102 held in bits associated with the target partition. Thus, the local sector manager 312 may perform a logic operation on a copy of the secure configuration data and the PR target mask 1104 to generate the second authentication bitstream 1106. The local sector manager 312 may then store the second authentication bitstream 1106 in the data register $DR_A$ 316A, as described by process block 1008 of FIG. 10. For example, the local sector manager 312 may AND together the PR target mask 1104 and the secure configuration data 1102 and then INVERT the result such that the second authentication bitstream 1106 holds the secure configuration data 1102 associated with non-target region(s) and clears for the bits corresponding to the secure configuration data 1102 associated with the target partition(s). The local sector manager may then store the second authentication bitstream 1106 along with the first authentication bitstream to facilitate the remaining parts of the validation check and to maintain security of the second authentication bitstream.

It should be noted that the second authentication bitstream may be calculated for a memory frame 504A, for multiple memory frames, for one or more sectors, or for the non-target regions as a whole. Further, although FIG. 11 depicts the second authentication bitstream as having the same length as the data register $DR_A$ 316A, the second authentication bitstream is of N-bit length that is independent of the length of the data register $DR_A$ 316A. Additionally, while FIG. 11 may be interpreted as showing the second authentication bitstream as being high-bit values per memory frame 504A, the second authentication bitstream values may actually represent an N-frame accumulation.

In this particular example, the local sector manager may determine whether the first authentication bitstream and second authentication bitstream match by shifting the authentication bitstreams from the local sector manager 312 to the data registers 316A, 316B, as described in the process block 1010 of FIG. 10. The configuration hardware may alternatively determine whether the authentication bitstreams match by performing a comparison within the local sector manager 312 or in the secure device manager 314. For example, the local sector manger 312 may shift bits of the first authentication bitstream into data register $DR_B$ 316B and of the second authentication bitstream into data register $DR_A$ 316A. The local sector manager 312 may then perform a bit-wise XOR logic operation between the first authentication bitstream and the second authentication bitstream.

The XOR logic operation may be performed after a single bit is shifted into the data registers 316A, 316B from the local sector manager 312 or after a data-register-bit-length worth of bits have been shifted into both data registers 316A, 316B. If the first authentication bitstream and the second authentication bitstream match, then the local sector manager 312 may indicate to the secure device manager 314 and/or the host processor 104 that the partial configuration did not modify the non-target regions of the programmable fabric 400 outside of the target partition and thus, the partial configuration occurred as intended.

Although this example 1100 depicts the process 1000 carried out through certain registers (e.g., data registers 316A, 316B), certain masks (e.g., validation mask 704), check values (e.g., check value 706), and logic operations, any combination of configuration hardware, masks, check values, and logic operations may be used to execute on-device configuration validation. For example, the PR target mask 1104 may comprise all ones when the memory frame 504A belongs entirely to the selected partition. Further, while example 1100 shows the partial configuration validation check for a single memory frame 504A, the process 1000 may be repeated to check multiple memory frames 504A, such as when two or more memory frames 504A are associated with the non-target region(s). Additionally, it should be noted that the same configuration hardware used to program the programmable device 202 may be used to perform the on-device partial configuration validation checks on non-target region(s). For example, the secure device manager 314 may generate the authentication bitstream check corresponding to the uncorrupted configuration data without revealing the value of the configuration data 1102 itself. That is, the secure device manager 314 may provide a secure way to check the modification of the non-target regions. This allows the configuration data 1102 to remain secure (e.g., signed, encrypted, compressed) since the on-device partial configuration validation check uses the designated configuration pathway.

Preventive On-Device Validation Prior to Configuration/Partial Configuration

Figure 12:
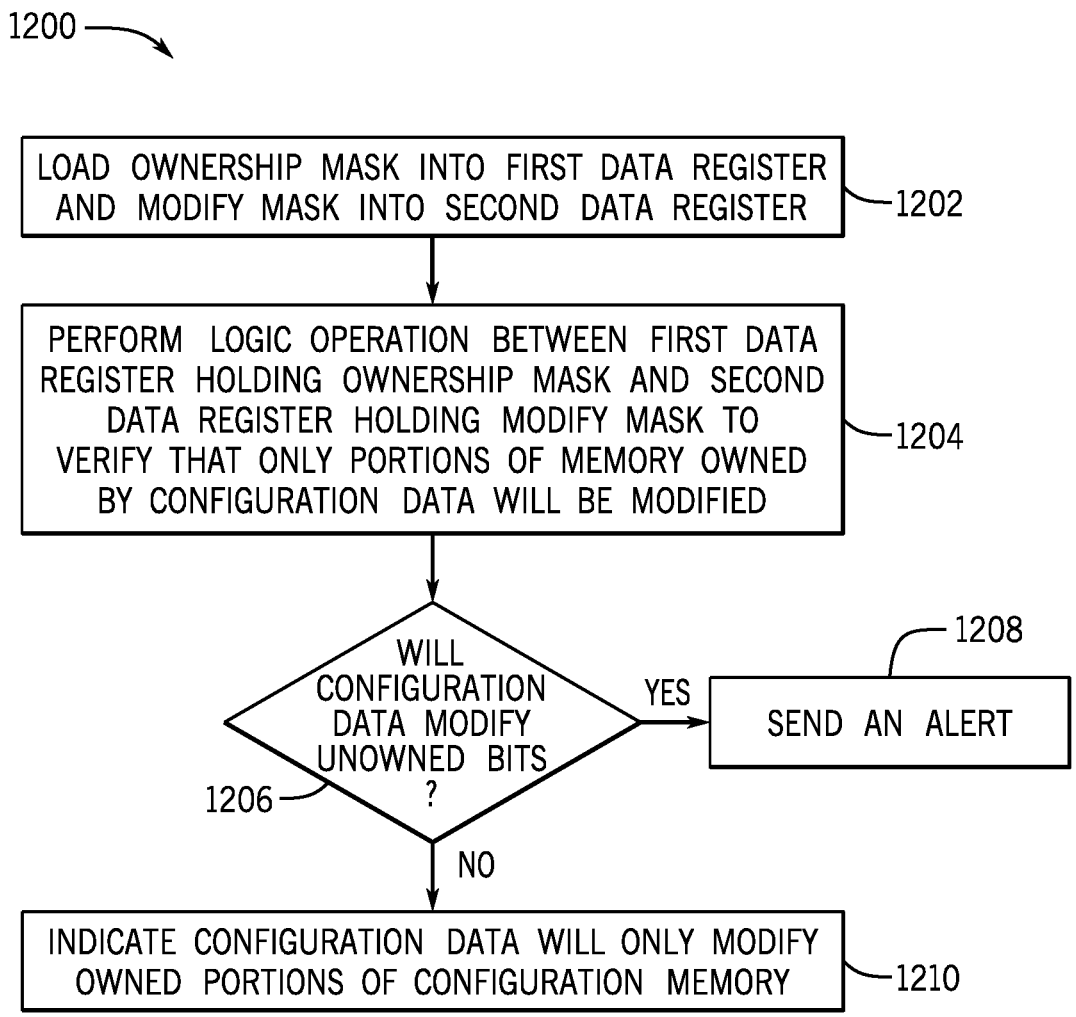
FIG. 12 is a flow diagram illustrating a process for preventive on-device validation of configuration data prior to programming the programmable device of FIG. 2, in accordance with embodiments of the present disclosure.

In some embodiments, validating the configuration data prior to programming may be advantageous in preventing malicious attacks and/or unintended modification of the programmable fabric 400. That is, preventive on-device validation of the configuration data may occur without every modifying the configuration memory 500 (e.g., loading configuration data into configuration memory 500). As such, FIG. 12 illustrates a process 1200 for performing the preventive on-device validation check that verifies whether the configuration data modifies unowned areas of the programmable fabric 400, in accordance with embodiments of the present disclosure. Generally, the process 1200 includes loading an ownership mask into the first data register (e.g., data register 316A) and a modify mask into the second data register (e.g., data register 316B) (process block 1202), performing a logic operation between the first data register holding the ownership mask and the second data register holding the modify mask to verify that only portions of configuration memory 500 owned by (e.g., associated with) the configuration data will be modified (process block 1204), determining whether the configuration data will modify unowned areas of the programmable fabric 400 (process block 1206), sending an alert if the configuration data will modify unowned memory 500 bits (process block 1208), and indicating that the configuration data will only modify parts of the configuration memory 500 owned by the configuration data (process block 1210).

Although the preventive on-device validation check described by process 1200 may be performed prior to programming the programmable device 202, the process 1200 may still use the same configuration hardware paths used in programming the programmable device 202. For example, the local sector manager 312 may coordinate logic hardware (e.g., registers) to perform the preventive on-device validation of process 1200. Specifically, local sector manager 312 may determine the type of on-device validation check that will be performed to verify that the programmable fabric 400 was programmed as intended. Additionally, the secure device manager 314 may generate an ownership mask and a modify mask based on the relationship between sectors 302 and target partitions. For example, the secure device manager 314 may generate the ownership mask whose bit values are set based upon the partition that the bits are associated with. For instance, the ownership mask bits associated with the target partition may be set as high bit values (i.e., ones) while those bits associated with the non-target region(s) may be set as low bit values (i.e., zeroes). To generate the modify mask, the secure device manager 314 may analyze a secure version of the configuration data to determine which bits of the configuration memory 500 will be modified by the configuration data. Bits of the modify mask that correspond to the bits to be modified by the configuration data may be set to as high bit values. The secure device manager 314 may also transmit the generated ownership mask and the generated modify mask to the local sector manager 312.

The process 1200 may be performed by any suitable device or combination of devices that may be programmed using configuration data and that may perform the on-device validation checks. While the process 1200 is described in a specific sequence, it should be understood that the present disclosure contemplates that the described process 1200 may be performed in different sequences than the sequence illustrated, and certain portions of the process 1200 may be skipped or not performed altogether. In some embodiments, at least some portions of the process 1200 may be implemented by a host processor 104. In alternative or additional embodiments, at least some parts of the process 1200 may be implemented by any other suitable components or control logic, such as the local sector manager 312, the secure device manager 314, and the like.

Thus, in some embodiments, the local sector manager 312 may load the modify mask and the ownership mask into separate data registers, such as data register 316A and data register 316B, respectively (process block 1202). The local sector manager 312 may load the ownership mask and the modify mask into the data registers 316A, 316B prior to programming to prevent intended and/or unintended malicious attacks. The secure device manager 314 may generate and/or secure the ownership mask, for example, based on the association of each bit of the ownership mask with the target partition(s) and non-target region(s). For example, the bits of the ownership mask associated with the target partition(s) may be set to as high bit values by the secure device manager 314 while bits associated with non-target region(s) that are to remain unmodified are set as low bit values when the memory frame (e.g., memory frame 504A) spans multiple sectors 302 and thus, possibly multiple partitions.

Additionally, the secure device manager 314 may generate and/or secure the modify mask based on the association of each bit of the modify mask with the bits of the configuration memory 500 that will be modified by the configuration data. For example, the bits of the modify mask associated with bits of configuration memory 500 that will be targeted for modification by the configuration data may be set as high bit values while bits of the modify mask associated with bits of the configuration memory 500 that will not be modified by the configuration data are set as low bit values.

The local sector manager 312, upon receiving instructions from the secure device manager 314 and/or the host processor 104, may perform a logic operation between the data register 316A holding the modify mask and the data register 316B holding the ownership mask to verify that only the portions of the configuration memory 500 owned by (e.g., associated with) the configuration data will be modified (process block 1204). For example, the secure device manager 314 may signal that an ANDINVB bit-wise parallel operation be performed on the ownership mask and the modify mask to verify that the configuration data will modify only portions of configuration memory 500 owned by the configuration data (e.g., only bits belonging to the target partition). Further, the local sector manager 312 may store the interleaved results into the data register (e.g., data register 316A).

The local sector manager 312 may determine whether the interleaved result is the same as the expected result and thus, whether the configuration data will leave unowned bits untouched (decision block 1206). For example, the local sector manager 312 may determine that the interleaved result includes all zeros, indicating that the configuration data will not modify unowned bits. If the interleaved result is not as what was expected, the local sector manager 312 may send an alert to the secure device manager 314 and/or host processor 104 to prevent programming of the programmable device 202 (process block 1208). If the interleaved result is as expected, the local sector manager 312 may send an indication to the secure device manager 314 and/or to the host processor 104 signaling that the configuration data will only modify portions of the configuration memory 500 owned by the configuration data (process block 1210).

Figure 13:
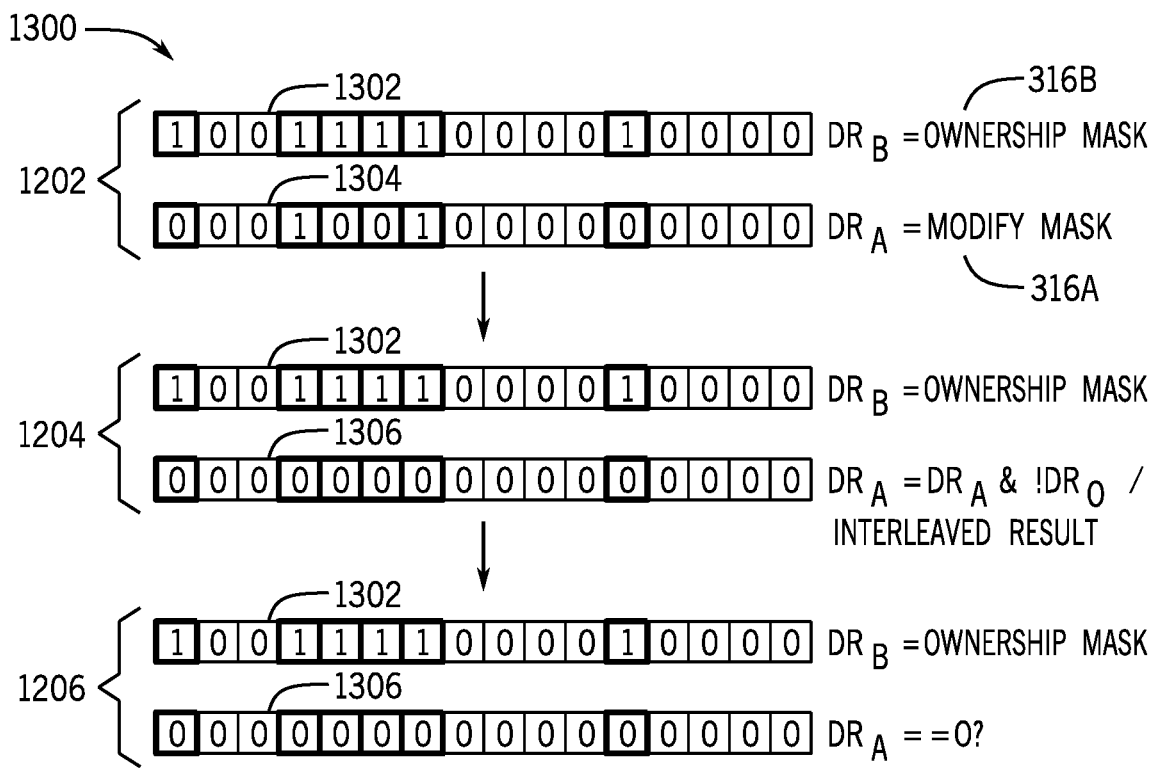
FIG. 13 is an example bit diagram of the process of FIG. 12 implemented by the configuration hardware of the programmable device of FIG. 2, in accordance with embodiments of the present disclosure.

FIG. 13 illustrates an example bit diagram 1300 of the process 1200 as performed by the configuration hardware of the FPGA 300, in accordance with embodiments of the present disclosure. As shown, the local sector manager 312 may load the ownership mask 1302 and the modify mask 1304 into the data registers $DR_B$ (e.g., data registers 316B) and $DR_A$ (e.g., data registers 316A), respectively, as described in the process block 1202 of FIG. 12. The secure device manager 314 may generate or receive the ownership mask 1302 and modify mask 1304, which are subsequently transmitted to the local sector manager 312. The secure device manager 314 may send additional signals to the local sector manager 312 indicating the type of preventive on-device validation to be performed and the logic operation to be used in the prevent on-device validation check.

In this example 1300, the ownership mask 1302 holds high bit values in those bits associated with the target partition (e.g., shaded bits) and low bit values in those bits associated with the non-target regions. The modify mask 1304 holds high bits values in those bits that will be modified by the configuration data and low bit values in those bits that will remain untouched by the configuration data. Bits of the modify mask 1304 corresponding to the target partition bits are shaded, as shown.

The local sector manager 312 may perform a logic operation between the ownership mask 1302 and the modify mask 1304 to determine whether the configuration data will modify parts of configuration memory 500 it does not own, as described in the process block 1204 of FIG. 12. That is, the local sector manager 312 verifies whether the configuration data is safe to program the programmable device 202 with prior to actual programming. For example, the local sector manager 312 may perform the ANDINVB bit-wise parallel operation between the data register 316B holding the ownership mask 1302 and the data register 316A holding the modify mask 1104 and store the interleaved results 1106 in the data register $DR_A$ 316A. The local sector manager 312 may determine whether the interleaved result 1106 matches the expected result (e.g., all zeros), as described in process block 1206 of FIG. 12. If the interleaved result 1306 is the same as the expected result, then the configuration data will modify only those bits of the memory frame 504A associated with the target partition.

Additionally or alternatively, the local sector manager 312 may perform an AND logic operation between the data register 316B holding the ownership mask 1302 and the data register 316A holding the modify mask 1104 to determine whether the configuration data will modify portions of configuration memory 500 it does not own. For example, the local sector manager 312 may perform the AND bit-wise parallel operation between the data register 316B holding the ownership mask 1302 and the data register 316A holding the modify mask 1104 and may store the interleaved result 1306 in the data register $DR_A$ 316A. The local sector manager 312 may determine whether the interleaved result 1306 matches the expected result (e.g., all zeros). If the interleaved result 1306 is the same as the expected result, then the configuration data will not modify any bits of the memory frame 504A and is thus considered safe.

Although this example 1300 depicts the process 1200 carried out through certain (e.g., data registers 316A, 316B), certain masks (e.g., validation mask 704), check values (e.g., check value 706), and logic operations, any combination of configuration hardware, masks, check values, and logic operations may be used to execute on-device configuration validation. For example, the ownership mask 1302 may comprise all ones when the memory frame 504A encompasses the entire programmable fabric 400. Further, while example 1300 shows the preventive validation check for a single memory frame 504A, the process 1200 may be repeated to check multiple memory frames 504A, such as when two or more memory frames 504A are associated with the non-target region(s). Additionally, it should be noted that the same configuration hardware used to partially configure the programmable device 202 may be used to perform the preventive on-device validation checks of the configuration data. For example, the secure device manager 314 may generate and/or secure the ownership mask 1302 and modify mask 1304, and the local sector manager 312 may perform the logic operation between the masks instead of storing and loading the configuration data into the configuration memory 500. Since the preventive-on device validation check does not use the value of the configuration data, the configuration data may remain secure and/or the programmable fabric 400 may remain safe from intended and unintended malicious attacks.

Similarly, preventive on-device validation checks of the configuration data may verify that the configuration data does not modify bits (e.g., attack bits) that it owns (e.g., bits of configuration memory 500 that are associated with the configuration data), but that could increase susceptibility to a malicious attack (e.g., peek, poke, malicious parasitic loading) if modified, in accordance with embodiments of the present disclosure. That is, preventive on-device validation checks may determine whether attack bits of the programmable fabric 400 will be modified by the configuration data prior to programming. Generally, the process 1400 includes loading an attack mask into the first data register (e.g., data register 316A) and a modify mask into a second data register (e.g., data register 316B) (process block 1402), performing a logic operation between the first data register holding the attack mask and the second data register holding the modify mask to verify that the attack bits associated with the configuration data are not modified (process block 1404), determining whether the configuration data will modify attack bits (process block 1406), sending an alert if the configuration data will modify the attack bits (process block 1408), and indicating that the configuration data will not modify the associated attack bits (process block 1410).

Although the preventive on-device validation check described by process 1400 may be performed prior to programming the programmable device 202, the process 1400 may still use the same configuration hardware paths that are used in programming the programmable device 202. For example, the local sector manager 312 may coordinate logic hardware (e.g., registers) to perform the preventive on-device validation of process 1400. Specifically, local sector manager 312 may determine the type of on-device validation check that will be performed to verify that the programmable fabric 400 was programmed as intended. Additionally, the secure device manager 314 may generate and/or secure the attack mask and the modify mask based on the relationship between sectors 302 and the programmable fabric 400. For example, the secure device manager 314 may generate the attack mask whose bit values are set based upon the attack bits in the target partition associated with the attack mask. For instance, the attack mask bits associated with the attack bits of the target partition may be set as high bit values (i.e., ones) while those bits not associated with the attack bits of the target partition may be set as low bit values (i.e., zeros). The secure device manager 314 may also transmit the attack mask and the modify mask to the local sector manager 312.

The process 1400 may be performed by any suitable device or combination of devices that may be programmed using the configuration data and that may perform the on-device validation checks. While the process 1400 is described in a specific sequence, it should be understood that the present disclosure contemplates that the described process 1400 may be performed in different sequences than the sequence illustrated and that certain portions of the process 1400 may be skipped or not performed altogether. In some embodiments, at least some portions of the process 1400 may be implemented by a host processor 104. In alternative or additional embodiments, at least some parts of the process 1400 may be implemented by any other suitable components or control logic, such as the local sector manager 312, the secure device manager 314, and the like.

Thus, in some embodiments, the local sector manager 312 may load the attack mask and the modify mask into separate data registers, such as data register 316A and data register 316B, respectively (process block 1402). The local sector manager 312 may load the attack mask and the modify mask into the data registers 316A, 316B prior to programming to prevent intended and/or unintended malicious attacks. The secure device manager 314 may generate the attack mask based on the association of each bit of the attack mask with the attack bits of the target partition(s) and non-target region(s). For example, the bits of the attack mask associated with the attack bits of the target partition may be set as high bit values while bits of the attack mask associated with safe bits of the target partition are set as low bit values. The attack bits may hold information relating to encryption keys, security protocols, and the like, which if modified, may compromise the ability of the FPGA 300 to secure the propriety information (e.g., the circuit design)

The secure device manager 314 may identify the attack bits, or bits whose modification may increase the programmable device's 202 susceptibility to attack. Attack bits may include bits corresponding to configuration memory 500 that hold security key information. To generate the modify mask, the secure device manager 314 may analyze a secure version of the configuration data to determine which bits of the configuration memory 500 are modified by the configuration data. Upon determining these bits, the secure device manager 314 may set the bits of the modify mask that correspond to the bits to be modified by the configuration data to a high bit value.

The local sector manager 312, upon receiving instructions from the secure device manager 314 and/or the host processor 104, may perform logic operations between the first data register holding the attack mask and the second data register holding the modify mask to verify that the configuration data will modify only safe bits of configuration memory 500 (process block 1404). For example, the secure device manager 314 may signal that an AND bit-wise parallel operation be performed on the attack mask and the modify mask and store the interleaved result in the data register (e.g., data register 316A).

The local sector manager 312 may determine whether the interleaved result is the same as the expected result and thus, whether the configuration data will leave attack bits unmodified (decision block 1406). For example, the local sector manager 312 may determine that the interleaved result includes all zeros, indicating that the configuration data will not modify the attack bits of the memory frame 504A. If the interleaved result is not as what was expected, the local sector manager 312 may send an alert to the secure device manager 314 and/or to that host processor 104 to halt or never initiate programming of the programmable device 202 and/or request a fresh copy of the configuration data (process block 1408). If the interleaved result is as expected, the local sector manager 312 may send an indication to the secure device manager 314 and/or host processor 104 to proceed with programming since the configuration data will not modify attack bits associated with the configuration data (process block 1410).

Figure 14:
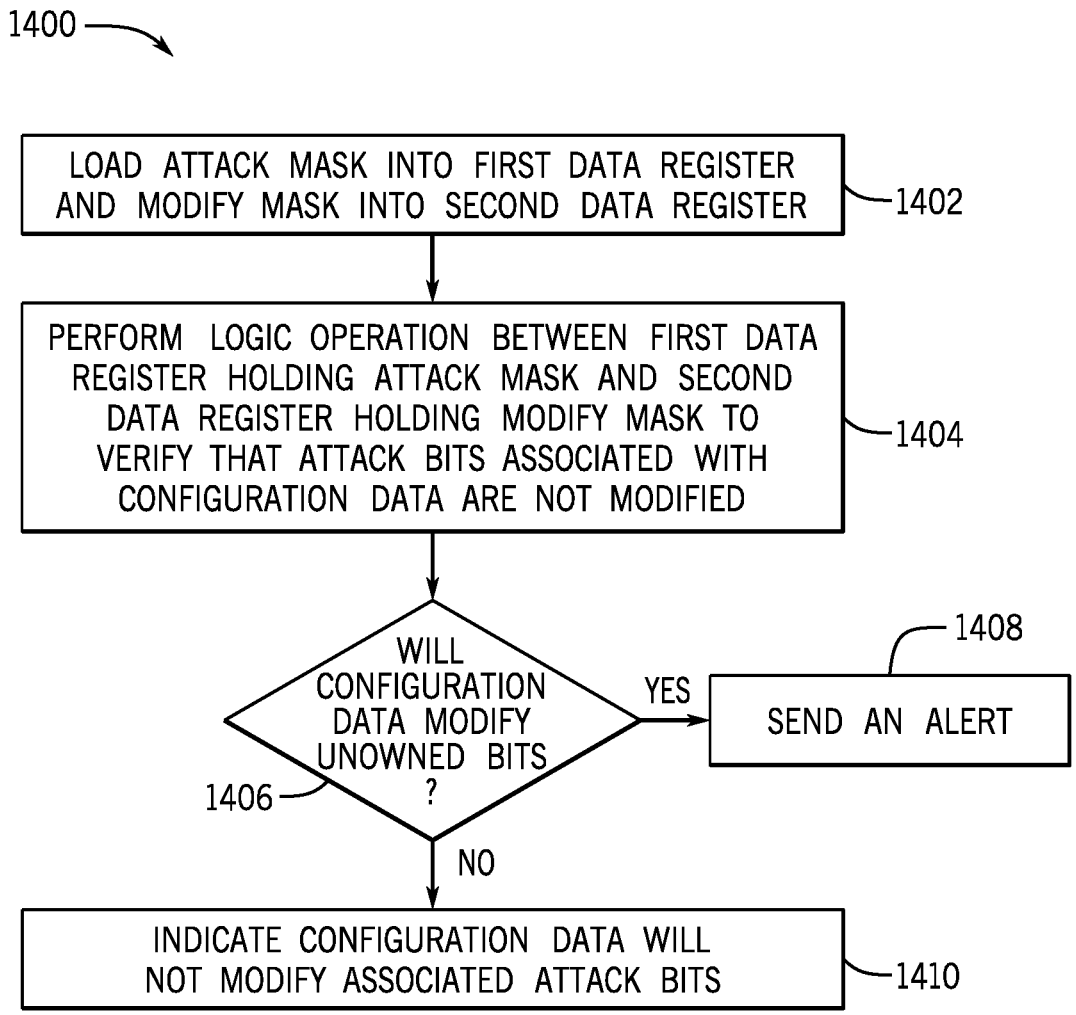
FIG. 14 is a flow diagram illustrating a process for preventive on-device validation of the configuration data prior to programming the programmable device of FIG. 2, in accordance with embodiments of the present disclosure.
Figure 15:
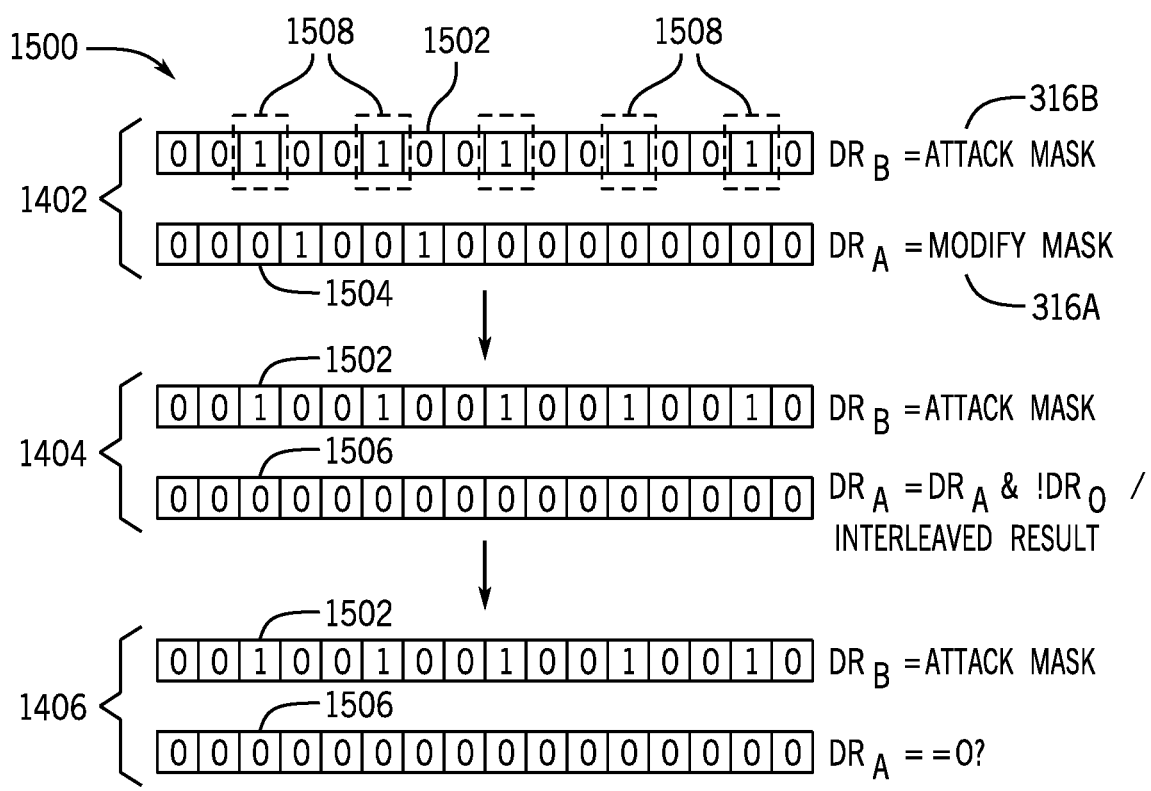
FIG. 15 is an example bit diagram of the process of FIG. 14 implemented by the configuration hardware of the programmable device of FIG. 2, in accordance with embodiments of the present disclosure.

FIG. 15 illustrates an example 1500 of the process 1400 as performed by the configuration hardware of the FPGA 300, in accordance with embodiments of the present disclosure. As shown, the local sector manager 312 may load the attack mask 1502 and the modify mask 1504 into the data registers $DR_B$ (e.g., data register 316B) and $DR_A$ (e.g., data register 316A), respectively, as described in the process block 1402 of FIG. 14. The secure device manager 314 may generate or receive the attack mask 1502 and modify mask 1504, which are subsequently transmitted to the local sector manager 312. The secure device manager 314 may send additional signals to the local sector manager 312 indicating the type of preventive on-device validation to be performed and the logic operation to be used in the prevent on-device validation check.

In this example 1500, the attack mask 1502 holds high bit values in those bits associated with the attack bits 1508 of the target partition's selected memory frame 504A and low bit values in those bits associated with the safe bits of the memory frame 504A. The modify mask 1504 holds high bits values in those bits that will be modified by the configuration data and low bit values in those bits that will remain untouched by the configuration data.

The local sector manager 312 may perform a logic operation between the attack mask 1502 and the modify mask 1504 to determine whether the configuration data will modify attack bits 1508 of the configuration memory 500 associated with the configuration data, as described in the process block 1404 of FIG. 14. For example, the local sector manager 312 may perform the AND bit-wise parallel operation between the first data register holding the attack mask 1502 and the second data register holding the modify mask 1504 and store the interleaved results 1506 in the data register $DR_A$ 316A. The local sector manager 312 may determine whether the interleaved result 1506 matches the expected result (e.g., all zeros), as described in process block 1406 of FIG. 14. If the interleaved result 1506 is the same as the expected result, then the configuration data will not modify associated attack bits 1508 of the memory frame 504A.

Although this example 1500 depicts the process 1400 carried out through certain registers (e.g., data registers 316A, 316B), certain masks (e.g., validation mask 704), check values (e.g., check value 706), and logic operations, any combination of configuration hardware, masks, check values, and logic operations may be used to execute on-device configuration validation. For example, the attack mask 1502 may comprise all attack bits 1508 of the programmable fabric 400 when the memory frame 504A encompasses the entire programmable fabric 400. Further, while example 1500 shows the preventive validation check for a single memory frame 504A, the process 1400 may be repeated to check multiple memory frames (e.g., memory frame 504A), such as when two or more memory frames (e.g., memory frame 504A) are associated with the target region(s). Additionally, it should be noted that the same configuration hardware used to program the programmable device 202 may be used to perform the preventive on-device validation checks of the configuration data. For example, the secure device manager 314 may generate the attack mask 1502 and modify mask 1504 and signal to the data register $DR_A$ 316A to perform the logic operation between the masks instead of storing and loading the configuration data into the configuration memory 500. Since the preventive-on device validation check does not use the value of the configuration data, the configuration data may remain secure and/or the programmable fabric 400 may remain safe from intended and unintended malicious attacks.

The processes 600, 800, 1000, 1200, and 1400 may be performed on the device together in any combination or alone. For example, THE on-device partial validation checks for target regions (process 800) may be performed with on-device partial validation checks for non-target partitions (process 1000) and with preventive on-device validation checks (process 1200) for determining ownership violation by the configuration data. Additionally, while the embodiments relate to on-device validation checks of configuration data before and/or after programming, the on-device validation checks may also be done before and/or after reprogramming of the programmable device 202.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A programmable logic device configured to verify that configuration data permissibly programs the programmable logic device, comprising:
    programmable fabric circuitry comprising one or more partitions, wherein the one or more partitions of programmable fabric are configured to be programmed by the configuration data;
    control circuitry configured to generate one or more masks based at least in part on the configuration data, wherein the one or more masks are configured to define a permitted partition of the one or more partitions is programmed by the configuration data; and
    a data register configured to:
        apply the one or more masks to generate an interleaved result that interleaves the one or more masks with the configuration data;
        compare the interleaved result to an expected result;
        send an indication that the configuration data permissibly programmed the permitted partition in response to determining that the interleaved result is the expected result; and
        send an alert to stop programming in response to determining that the interleaved result is not the expected result.

2. The programmable logic device of claim 1, wherein the data register is configured to apply the one or more masks to generate the interleaved result by performing a first logic operation on the one or more masks, the configuration data, or a combination thereof.

3. The programmable logic device of claim 2, wherein the programmable logic device comprises one or more data registers configured to store the one or more masks, the configuration data, the interleaved result, and the expected result, wherein the data register is configured to send instructions to perform the first logic operation on the one or more masks and the configuration data.

4. The programmable logic device of claim 2, wherein the data register determines that the interleaved result is the expected result by performing a second logic operation on the interleaved result and the expected result.

5. The programmable logic device of claim 4, wherein the expected result comprises an uncorrupted version of the configuration data associated with the one or more partitions.

6. The programmable logic device of claim 1, wherein a configuration-network-on-chip architecture programs the programmable fabric using the configuration data.

7. The programmable logic device of claim 1, wherein the one or more masks are secured using encryption support hardware in the control circuitry, encryption key management, or a combination thereof.

8. A non-transitory machine-readable storage medium encoded with instructions for verifying that configuration data permissibly programs a permitted partition of a programmable fabric of a programmable logic device, the instructions comprising:
    receive one or more masks generated by control circuitry of the programmable logic device based at least in part on the configuration data, wherein the one or more masks are configured to determine that the permitted partition is programmed by the configuration data stored in memory of the programmable logic device;
    apply the one or more masks to generate an interleaved result that combines the one or more masks with a copy of the configuration data;
    compare the interleaved result to an expected result;
    send an indication that the configuration data permissibly programmed the permitted partition in response to determining that the interleaved result is the expected result; and
    send an alert to stop programming in response to determining that the interleaved result is not the expected result.

9. The non-transitory machine-readable storage medium of claim 8, wherein the permitted partition comprises the entire programmable fabric.

10. The non-transitory machine-readable storage medium of claim 9, wherein the programmable logic device comprises a first data register configured to store a validation mask of the one or more masks and a second data register, wherein the validation mask is configured to filter out data that is not the configuration data, wherein a third data register of the programmable logic device is configured to send instructions comprising:
    perform a first logic operation on the validation mask and the configuration data to remove the data that is not the configuration data associated with the permitted partition;
    store the configuration data associated with the permitted partition as the interleaved result in the first data register; and
    perform a second logic operation on the interleaved result and the expected result held in the second data register.

11. The non-transitory machine-readable storage medium of claim 10, wherein when the programmable fabric comprises one or more non-target regions, the third data register is configured to send instruction to verify that the configuration data permissibly programmed the permitted partition and did not modify the one or more non-target regions.

12. The non-transitory machine-readable storage medium of claim 11, wherein the one or more non-target regions comprise non-target partitions of the programmable fabric, static regions of the programmable logic device, or a combination thereof.

13. The non-transitory machine readable storage medium of claim 11, wherein to verify that the configuration data permissibly programmed the permitted partition, a first data register of the programmable logic device is configured to store a partial reconfiguration (PR) target mask of the one or more masks, wherein the PR target mask is configured to filter out the configuration data associated with the one or more non-target regions, wherein the third data register is configured to send instructions to:
    perform a first logic operation on the PR target mask and the configuration data to remove the configuration data associated with the one or more non-target regions;
    store the configuration data associated with the permitted partition as the interleaved result in the first data register; and perform a second logic operation on the interleaved result with the expected result held in a second data register of the programmable logic device.

14. The non-transitory machine readable storage medium of claim 11, wherein to verify that the configuration data did not modify the one or more non-target regions, the third data register is configured to send instructions comprising:
perform a first logic operation on a partial reconfiguration (PR) target mask of the one or more masks stored in a first data register of the programmable logic device and the configuration data to remove the configuration data associated with the permitted partition; and
store the configuration data associated with the permitted partition as the interleaved result in the first data register.

15. A method for verifying that configuration data is configured to permissibly program a permitted partition of a programmable fabric of a programmable logic device, comprising:
receiving one or more masks generated by a control circuitry of the programmable logic device, wherein the one or more masks are configured to determine whether the configuration data is configured to program the permitted partition permissibly;
applying the one or more masks to generate an interleaved result that combines the one or more masks with the configuration data;
comparing the interleaved result to an expected result;
sending an indication that the configuration data is configured to permissibly program the permitted partition in response to determining that the interleaved result is the expected result; and
sending an alert to prevent programming in response to determining that the interleaved result is not the expected result.

16. The method of claim 15, wherein the programmable fabric comprises one or more non-target regions, wherein the configuration data remains external to the programmable logic device.

17. The method of claim 16, comprising:
storing an ownership mask of the one or more masks in a first data register of the programmable logic device and a modify mask of the one or more masks in a second data register of the programmable logic device, wherein the ownership mask is configured to indicate portions of the programmable fabric associated with the configuration data, wherein the modify mask is configured to indicate the portions of the programmable fabric that are to be modified by the configuration data, wherein applying the one or more masks comprises:
performing a first logic operation on the ownership mask and the modify mask to generate the interleaved result configured to indicate whether the configuration data is configured to modify the non-target regions; and
storing the interleaved result in the first data register.

18. The method of claim 15, wherein the configuration data remains external to configuration memory of the programmable logic device, wherein the permitted partition comprises safe bits and attack bits.

19. The method of claim 18, wherein the safe bits are configured to be modified without increasing susceptibility of the programmable logic device to malicious attacks, wherein the attack bits are not configured to be modified without increasing susceptibility of the programmable logic device to malicious attacks.

20. The method of claim 18, comprising:
storing an attack mask of the one or more masks in a first data register of the programmable logic device and a modify mask of the one or more masks in a second data register of the programmable logic device, wherein the attack mask is configured to indicate attack bits of the programmable fabric, wherein the modify mask is configured to indicate portions of the programmable fabric that are to be modified by the configuration data, wherein applying the one or more masks comprises:
performing a first logic operation on the attack mask and the modify mask to generate the interleaved result configured to whether the configuration data is configured to modify the attack bits of the permitted partition; and
storing the interleaved result in the first data register.

21. The non-transitory machine readable storage medium of claim 14, wherein the interleaved result comprises a linear-feedback shift register (LFSR) result.

* * * * *